US008407620B2

(12) United States Patent
Cadiz et al.

(10) Patent No.: US 8,407,620 B2
(45) Date of Patent: Mar. 26, 2013

(54) SYSTEM AND PROCESS FOR PROVIDING DYNAMIC COMMUNICATION ACCESS AND INFORMATION AWARENESS IN AN INTERACTIVE PERIPHERAL DISPLAY

(76) Inventors: Jonathan J. Cadiz, Redmond, WA (US); Anoop Gupta, Woodinville, WA (US); Gavin Jackie, Sammamish, WA (US); Gina Venolia, Kirkland, WA (US)

( * ) Notice: Subject to any disclaimer, the term of this patent is extended or adjusted under 35 U.S.C. 154(b) by 103 days.

(21) Appl. No.: 12/762,037

(22) Filed: Apr. 16, 2010

(65) Prior Publication Data

US 2010/0199190 A1 Aug. 5, 2010

Related U.S. Application Data

(63) Continuation of application No. 11/395,144, filed on Apr. 3, 2006, now Pat. No. 7,725,832, which is a continuation of application No. 10/063,296, filed on Jun. 8, 2001, now abandoned.

(51) Int. Cl.
*G06F 3/00* (2006.01)
(52) U.S. Cl. ........ 715/835; 715/838; 715/810; 715/788; 715/783; 715/815
(58) Field of Classification Search .................. 715/736, 715/774, 815, 810
See application file for complete search history.

(56) References Cited

U.S. PATENT DOCUMENTS

| | | | |
|---|---|---|---|
| 5,129,052 A | 7/1992 | Barker et al. | |
| 5,339,392 A | 8/1994 | Risberg et al. | |
| 5,659,693 A * | 8/1997 | Hansen et al. | 715/779 |
| 5,751,965 A * | 5/1998 | Mayo et al. | 709/224 |
| 5,793,365 A * | 8/1998 | Tang et al. | 715/758 |
| 5,796,365 A | 8/1998 | Lewis | |
| 5,819,055 A | 10/1998 | MacLean et al. | |
| 5,937,417 A | 8/1999 | Nielsen | |
| 6,029,175 A | 2/2000 | Chow et al. | |
| 6,031,530 A | 2/2000 | Trueblood | |
| 6,182,098 B1 | 1/2001 | Selker | |
| 6,259,461 B1 | 7/2001 | Brown | |
| 6,311,221 B1 | 10/2001 | Raz et al. | |
| 6,577,329 B1 | 6/2003 | Flickner et al. | |
| 6,647,410 B1 | 11/2003 | Scimone et al. | |
| 6,693,652 B1 | 2/2004 | Barrus et al. | |
| 6,725,268 B1 * | 4/2004 | Jackel et al. | 709/227 |
| 6,727,918 B1 * | 4/2004 | Nason | 715/791 |
| 6,853,388 B2 * | 2/2005 | Ueno et al. | 715/736 |
| 6,892,226 B1 | 5/2005 | Tso et al. | |
| 7,430,724 B2 | 9/2008 | Othmer | |
| 7,441,203 B2 | 10/2008 | Othmer et al. | |
| 2001/0047347 A1 * | 11/2001 | Perell et al. | 707/1 |
| 2002/0059594 A1 | 5/2002 | Rasmussen et al. | |
| 2002/0080170 A1 | 6/2002 | Goldberg et al. | |
| 2002/0135621 A1 | 9/2002 | Angiulo et al. | |
| 2002/0161837 A1 | 10/2002 | Sasaki et al. | |

OTHER PUBLICATIONS

Nobuyuki Hayashi, "Interface, Exhaustive Study on new OS, new operation system, and Aqua Interface," Mac Power, Complete Guide for Introduction of Mac OS X, vol. 12, No. 5, ASCII Corporation, May 1, 2001, pp. 14-17.

(Continued)

*Primary Examiner* — Michael Roswell
(74) *Attorney, Agent, or Firm* — Senniger Powers LLP

(57) ABSTRACT

The system and method of the present invention provides peripheral awareness of information to a user. Once the information to be provided is determined or specified, it is automatically tracked or watched via at least one conventional communications interface for accessing one or more conventional communications sources. Current information is then automatically dynamically provided in an interactive peripheral display which minimizes any potential distraction to the user. The tickets are sharable among users, and may be copied, cut, pasted, saved, transmitted, dragged and dropped from web pages, etc., like any other electronic file using conventional techniques.

19 Claims, 14 Drawing Sheets

OTHER PUBLICATIONS

BotKnowledge, "InfoGate Review", 2000. from www.botknowledge.com/infogatereview.htmlm,1 page.

Corporate Portals Letter, vol. 1, No. 10, Oct. 2000,3 pages.

Konfabulator, Version 2.1.1, Aug. 3, 2005 at www.konfabulator.com, downloaded 1 111 5/05.

Multiplying enterprise Application ROI, An Octopus Whitepaper. Apr. 2001, Downloaded from www.octopus.com Jun. 11, 2001.

N. Marmasse, "Commotion: a context-aware communication system". In Proceedings of CHI, 1999.

Printout of representative pages from www.dodots.com website: Jun. 11, 2001.

Printout of representative pages from www.enfish.com website: Jun. 11, 2001.

Printout of representative pages from www.infogate.com website: Jun. 11, 2001.

Printout of representative pages from www.snippets.com website: Jun. 11, 2001.

S. Greenberg and M. Rounding, The Notification Collage: Posting Information to Public and Personal Displays, Yellow Series Report 2000-667-19, Department of Computer Science, University of Calgary, Alberta, Canada. Publication date unknown.

S. Paroswith, et al., "Tickertape: Notification and Communication in a Single Line". Publication date unknown.

Snippets Product Overview. Downloaded from www.snippets.com Jun. 11, 2001.

The Octopus Platform. Downloaded from www.octopus.com Jun. 11, 2001.

* cited by examiner

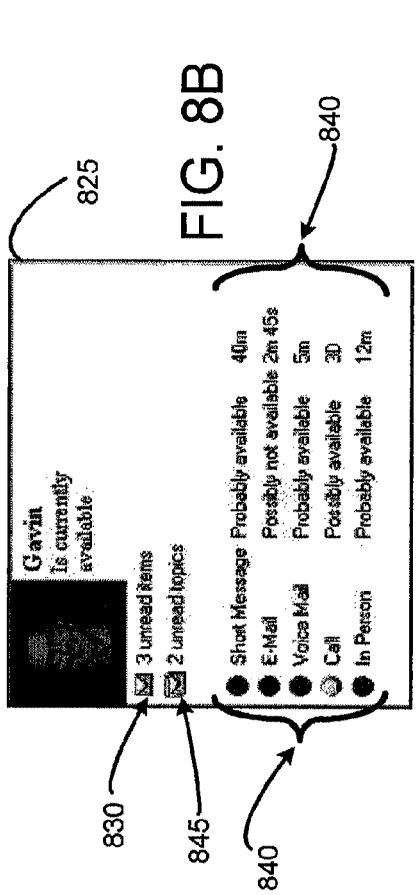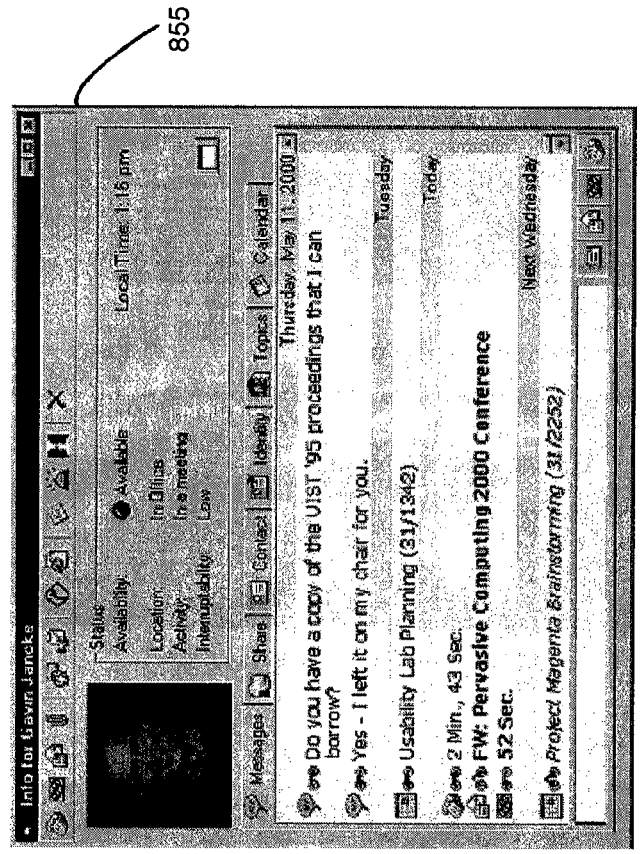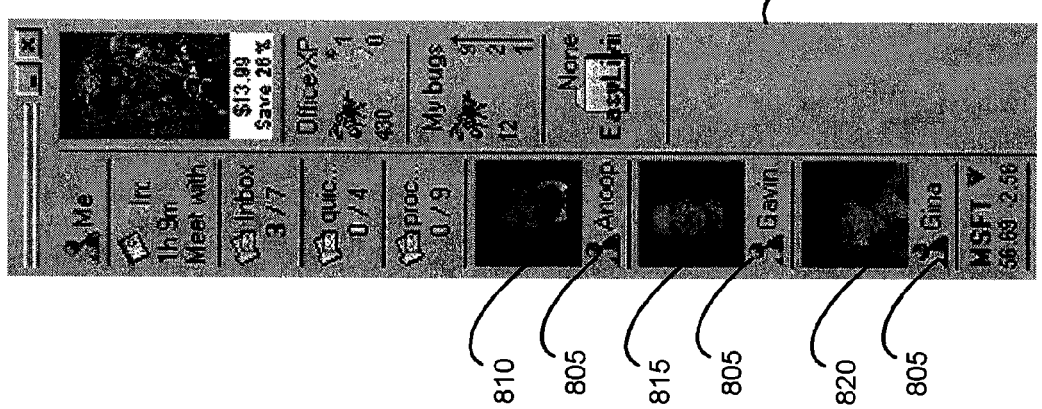
FIG. 8B
FIG. 8C
FIG. 8A

SYSTEM AND PROCESS FOR PROVIDING DYNAMIC COMMUNICATION ACCESS AND INFORMATION AWARENESS IN AN INTERACTIVE PERIPHERAL DISPLAY

RELATED APPLICATIONS

This application is a continuation and claims the benefit of U.S. application Ser. No. 11/395,144 filed Apr. 3, 2006, which claims the benefit of U.S. non-provisional application Ser. No. 10/063,296 filed Jun. 8, 2001, the entire content of each of which is hereby incorporated herein by reference.

BACKGROUND

The present invention involves a new system and process for providing dynamic communication access and information awareness in an interactive peripheral display.

By way of background, in today's information saturated environments, such as the Internet, a local or remote computer network, or any combination of the Internet and such networks, it is often difficult for a user to keep track of the potentially large amounts and variety of communications and information which the user may be interested in. Such communications and information include, for example, email, instant messaging, file transfers, local weather, appointments, schedules, personal contacts, statistical information, file status, stock quotes, sports scores, local traffic, or any other type of communications or information that may be of interest to the user. This problem becomes particularly acute where the communications and/or information are dynamic, such that rapid, numerous, or large changes to the communications status or channels, or in the information of interest to the user results in out of date communications and/or information that is often relatively useless to a user.

In response to this problem, several conventional schemes have been developed to assist users in attempting to keep track of specific communications or information without requiring a user to manually search out or manually check for updates to the communications or information each time the user wants to examine the communications or information. However, such schemes are typically limited by what types of communications or information can be tracked or displayed, by the manner in which the communications or information is accessed or otherwise provided to the user, or by the inability to facilitate sharing of the communications or information between users. Further, conventional schemes that have attempted to address these problems tend to be limited by an inability to provide a single interface that allows for concurrent information retrieval, display or access in combination with communications and communication access points in a dynamic integrated environment. Consequently, users are often left with cluttered displays which provide access or interaction with either particular types of communications, or with specific information, but not with both communications and information access and interaction in an integrated environment.

Several conventional messaging type schemes have attempted to partially address some of these problems. However, such schemes typically provide relatively large windows that take up substantial amounts of screen or display real estate. Further, such schemes, while providing some communications capabilities along with some information gathering or display capabilities, tend to separate the communications capabilities from the information capabilities via one or more tabs or the like. Consequently, particular information can not be easily shared or communicated from within the applications provided by these schemes. Further, such schemes become unwieldy as the amount of information being tracked by a user increases, and as the number of communications contacts maintained by the user increases. In particular, as the amount of contacts and/or information increases, the user is forced to scroll through large amounts of data or communications channels to find what he or she is looking for.

For example, several conventional messaging type schemes provide similar capabilities for keeping track of or watching information, such as for example stock quotes, weather, news, or other information via the Internet or some other local or remote network, or some combination thereof. Further these conventional schemes also provide for some sort of communications access such as, for example, text instant messaging, file transfer, email, etc., via one of a number of communications channels for contacts in one or more groups of contacts. Consequently, a user is able to keep track of particular information of interest, as well as to communicate with particular people or entities. Unfortunately, with these schemes, the user can not do both simultaneously. He is forced to tab between the different types of information and the communications capabilities. Therefore, the user is unable to share data observed via the different information tabs with contacts in the communications tab unless the user manually saves or copies the information, switches tabs, then manually creates a message to a particular contact, and either attaches or pastes the information to that message.

Further, because these conventional schemes tend to have a number of tabs, they require a fairly large window in order to display the information and associated controls or icons. Unfortunately, such windows tend to get buried under other application windows when the user is using other applications. Consequently, the user is often forced to interrupt his or her flow of work to switch between windows. This particular problem has been addressed by some of these schemes by providing an option to always keep the window on top. Consequently, while solving the problem of burying the messaging window, a new problem is created. Specifically, the messaging window then occludes a potentially large part of any other open application window. While it is possible to manually resize the different application windows and to move them around the screen in an attempt to give each window its own space, such manual user intervention can be both time consuming and aggravating for the typical user.

At least one conventional scheme has attempted to address some of the problems of the aforementioned schemes. For example, one conventional scheme provides an application that allows a user to customize at least one icon in a scrollable strip along one edge of a computer display device. This scheme provides iconized links to particular information sources, and uses conventional techniques to populate each customized icon with information retrieved from the information sources. However, this scheme has several important limitations.

In particular, while this scheme provides for gathering and providing information to a user, it fails to provide the level of communications capabilities offered by the aforementioned messaging schemes. For example, this scheme does not provide a means for initiating communication via an icon, so while an icon may provide a communication status, such as a number of received messages, it does not provide a means for responding to such messages. Further, this scheme does not provide for nesting or otherwise organizing groups of icons in order to aggregate multiple icons. In other words, opening the window associated with one icon does not provide access to further levels of grouped icons. Consequently, it is difficult to organize icons where a large number of icons are used. In addition, the icons of this scheme are not easily transportable. In other words, there is no real mechanism for transferring icons between users. Instead, users are required to obtain the icons from an application used for managing the icons. Other limitations of this scheme include a lack of an ability to resize the window containing the scrollable strip used for displaying the icons. Further, with this scheme, if a user adds too many items, another row or strip is automatically created within the window, even if that row has only one icon. Consequently, this scheme can potentially cause a large waste of valuable display space.

A related scheme allows a user to customize a scrolling ticker type display window to provide continuously updated scrolling information from a predefined set of available information. While useful, this scheme is even more limited than the prior scheme for several reasons. Most important among these limitations is that the set of information that is available to this scheme is predefined. Thus, if the information type and source is not listed as an option with this scheme, it is simply not available. However, users are provided with limited control over certain information options, such as, for example, specific stock symbols for stock quotes, choosing areas or topics of news to generate an automatic alert, or choosing particular cities to generate a weather report. Another limitation is that users are not able to add or edit information sources, such as by modifying the icons as described above. Further limitations of this scheme include that fact that since the ticker scrolls, there is no guarantee that all the information of interest will be visually available at any given time. Specifically, if the information of interest to a user is not currently visible, the user must wait until the information scrolls into view. Consequently, such a scheme can become very distracting to the user as the user is forced to direct a large amount of attention to the display in order to retrieve desired information. Further, because the scrolling ticker is in constant motion, it is in itself potentially very distracting to a user as it creates a persistent motion in the user's peripheral vision. Finally, the communications capability of this scheme is virtually nonexistent in comparison to the aforementioned messaging schemes.

Still other schemes for providing custom information views or displays involve a technique known as "web scraping." In general, such schemes allow a user to specify particular portions of unique Internet Web pages, i.e., source web pages, to be displayed on a single customized web page. Consequently, while such schemes provide for information retrieval and display, they do not provide for communications capability.

For example, one web scraping scheme allows users to "clip" relevant data and content from various Internet web sites and pull it all together in one dynamic browser page, called a "view." This view is effectively a composite web page. Thus, as any of the source web pages are changed, the composite web page is automatically updated. Further, this scheme allows users to edit views in a variety of ways, such as by adding, deleting and rearranging data elements and personalizing the view with the users own inputs. In addition, this scheme provides a method for transferring views between users. However, this scheme suffers from many of the same basic limitations described above with respect to the aforementioned schemes. Such limitations include an inability to nest or organize views, or to arrange for a plurality of views to be displayed simultaneously. Also, as mentioned above, such schemes typically provide little or no communications or messaging capabilities.

Further limitations of web scraping include the fact that the views of this scheme must be opened in a window that typically takes up a substantial portion of a display device, if not the entire display device, and thus, it cannot provide an unobtrusive method for providing information to the user. In addition, typical web pages, as well as specific content of those web pages, are typically not designed to minimize the area in which information is displayed. In other words, such web pages and content are simply not designed with the idea of squeezing lots of important information into very small spaces. Consequently, the end result of web scraping is a composite web page that tends to be a very inefficient use of screen space. Further, if a portion of the web page that is scraped or otherwise clipped from an existing web page includes an animation, the web page can be very distracting if it's in the user's peripheral vision. Finally, because the web scraping technique is effectively a patchwork of distinct elements, the composite web page resulting from such techniques is typically an unappealing jumble of disparate elements that were never visually designed to appear together on a single page.

Consequently, what is needed is new system and process for automatically providing dynamic communication access and information awareness in an interactive peripheral display without requiring a user to tab between communications channels or information types. Further, such a system and process should not require a user to choose from a predefined list of communication access points and information categories or sources, but instead should allow for creation and customization of communications access points and information sources. Such communications access points should include communications channels for contacting other entities, such as, for example, people, businesses, or organizations, along with the current availability of each of the contacts via any of a variety of contact methods, such as email, voicemail, messaging servers, telephone, etc. The information sources should include any desired information elements, such as, for example, specific information types, information categories, or information sources. In addition, this system and process should allow users to customize and aggregate or organize any desired communication channels or access points, or any desired information sources into any desired number of groups or nested groups. Also, these groups or nested groups should be capable of being expanded by the user to allow the user to view nested groups or communication access points or information elements within these groups or nested groups. Finally, this system and process should provide for sharing of pre-defined or user definable communications access points and/or information elements between users.

SUMMARY OF THE INVENTION

In general, the present invention solves the aforementioned problems, as well as other problems that will become apparent from an understanding of the following description by automatically providing dynamic communication access and information awareness in an integrated interactive peripheral display. The present invention provides this capability either automatically, and/or by allowing a user to specify particular information or communications contacts of interest to that user. Customized dynamic thumbnails representing each contact and each particular information element are then automatically displayed.

These dynamic thumbnails or "items" generally comprise a combination of a "ticket" describing the information or contact of interest and a specialized "viewer" for displaying whatever information or communications contact is represented by the ticket. Further, in accordance with the present invention, in one embodiment, tickets are sharable among users via conventional techniques, and may be copied, cut, pasted, stored, saved, transferred, transmitted, emailed, dragged and dropped from web pages, etc., like any other electronic file. The system and process of the present invention then either automatically tracks or receives the current state of the information and communications contacts described by the tickets, and dynamically provides current information as well as availability and status of the communications contacts in an interactive "peripheral awareness" interface for displaying the items. The peripheral awareness interface displays information and/or communications contacts in such a way as to minimize any potential distraction or interruption to the user.

In the context of the present invention, the concept of "peripheral awareness" is best explained by the following discussion. In general, the peripheral awareness interface of the present invention takes advantage of people's innate ability to receive information about the world around them without significantly interrupting their focal tasks. One trivial example of this innate ability of people to perceive information in a peripheral manner without interrupting their focal task is that a person might overhear a discussion in the hallway between Bob and Jane and realize that Jane has returned from her vacation. The present invention takes advantage of this ability with the peripheral awareness interface. Such peripheral awareness interfaces are always on and visible rather than being a discrete user interface event that is shown when there is a state change of some information. Thus, peripheral awareness, in accordance with the present invention does not blatantly draw the user's attention to new or updated information immediately, but instead makes it available in the periphery so that it may be observed if and when the user decides to glance that way. Further, in one embodiment, to increase the effectiveness of user notification, the peripheral awareness interface utilizes both strategies of peripheral awareness and notification, i.e., audible and/or visible alert, depending upon the time sensitivity or priority of the information. The peripheral awareness interface of the present invention provides a display area on a user's display device for displaying items as described herein.

Further, with respect to communications contacts, the system and method of the present invention provides a "person-centric interface" for interacting with the contacts. This person centric interface is designed such that people or other entities are brought to the forefront of the peripheral display so that communications with particular persons or entities may be reviewed or initiated easily, while the communications availability of such people or entities may be understood by a user by simply glancing at the peripheral display. This capability is accomplished by displaying pictures, images, icons, avatars, etc., within each item that represents a particular communications contact for visually representing the communications availability or status for each communications contact. In alternate embodiments, this person centric interface further includes contact specific information such as, for example, communication history, and communications availability, as well as communications access and interaction for particular contacts via any of a number of access points or communication channels, such as, for example, email, messaging servers, voice mail, telephone numbers, peer-to-peer file transfer, etc.

Specifying, tracking or receiving, and providing the information and communications capabilities, as noted above, is accomplished in accordance with the present invention through the use of at least one customizable dynamic encapsulated object, hereinafter referred to as a "ticket," that when paired with a "viewer," provides peripheral awareness of information of interest to a user. As noted above, the combination of a ticket and a viewer is termed an "item."

In general, a ticket is represented by a data structure such as an XML data file. Each ticket includes instructions as to what information or communications contact is to be represented by the ticket as well as pointers to particular "services" that represent any of a number of conventional means for interacting with the information or communications contacts. These services are automatically or manually selected from a predefined or user definable library of services. In particular, the different services represent shared code or functions that provide functionality for accessing, receiving, retrieving, and/or otherwise interacting with any conventional information, source of information, or communications contact. Further, it should be noted that in one embodiment multiple services are used in combination for providing complex interactions with any conventional information, source of information, or communications contact.

In the context of the present invention, one example of a "service" is the functionality necessary for monitoring an email folder by connecting to a conventional MAPI server. Another example of a service is functionality for sending or receiving email messages. Related services provide functionality for communicating with contacts or transferring information via any number of conventional methods, such as, for example instant messaging or peer-to-peer communications schemes. Another example of a service is functionality to convert a text file from one language to another. A further example of a service is functionality necessary for monitoring a database. Still another example of a service is functionality for receiving or retrieving data from a web site or a remote server. Clearly, any conventional method for interacting with any conventional information, source of information, or communications contact can be implemented as a shared service for use by one or more tickets in accordance with the present invention.

Further, as noted above, each ticket's instructions includes a pointer to one of a number of specialized viewers having the capability to display whatever type of information or communications contact is represented by the ticket. In other words, each ticket represents a combination of the information or contact that a user desires to keep track of along with a definition of how the user desires to view that particular information as well as the ability to use any of a number of conventional means for accessing and/or interacting with the information or contact.

For example, information of interest to a user may include statistical information relating to a particular electronic file residing on a remote electronic database. Given this simple example, the user may be interested in knowing how many people have read the electronic file, or whether it has been modified. Consequently, the customizable ticket includes instructions for using a "service" for linking to the remote server hosting the electronic file such that the can collect the statistical information as it becomes available. Further, the ticket includes instructions as to what data is to be displayed, and which viewer is to be used to display that data. Such instructions for displaying the data may simply include instructions to display the number of people that have read the file, and/or instructions to change the color of the displayed information when the file has been modified by anyone other than the user. Clearly, this example is not meant to limit what information or data may be displayed, or how the information or data is to be displayed, as many other types of statistical or other data relating to such files, or to any other information of interest, can be collected and/or displayed in accordance with the present invention.

As discussed above, each ticket is paired with a "viewer" to create an "item." These viewers graphically display the ticket as a resizable thumbnail or icon-sized window having the information or contact data retrieved via one or more of the services in accordance with the aforementioned ticket instructions. In particular, the viewer is capable of dynamically displaying a ticket having textual, audible, or graphical information, including still or live images, or any combination of textual, audible, or graphical information. For example, one viewer type is capable of displaying contact information, i.e. a "person ticket" as described below, another is capable of displaying specific email information, such as, for example, number of messages received, or number of messages from a particular source, another viewer is designed to interact with a database to provide a summary of particular information from the database in the thumbnail. Further examples of viewer types include viewers capable of displaying still images, video images, a summary of communications status, the results of a database query, etc. Clearly, any type of viewer can designed to be associated with any corresponding type of information to ensure that any possible information can be displayed.

In addition to the just described benefits, other advantages of the present invention will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

FIG. 8A is an exemplary screen image illustrating an alternate embodiment of a peripheral awareness interface showing pawns associated with person items in accordance with the present invention.

FIG. 8B is an exemplary screen image illustrating a dynamic person window accessed by selection of one of the person items of FIG. 8A.

FIG. 8C is an exemplary screen image illustrating historical communications information associated with the person represented by the person window of FIG. 8B.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
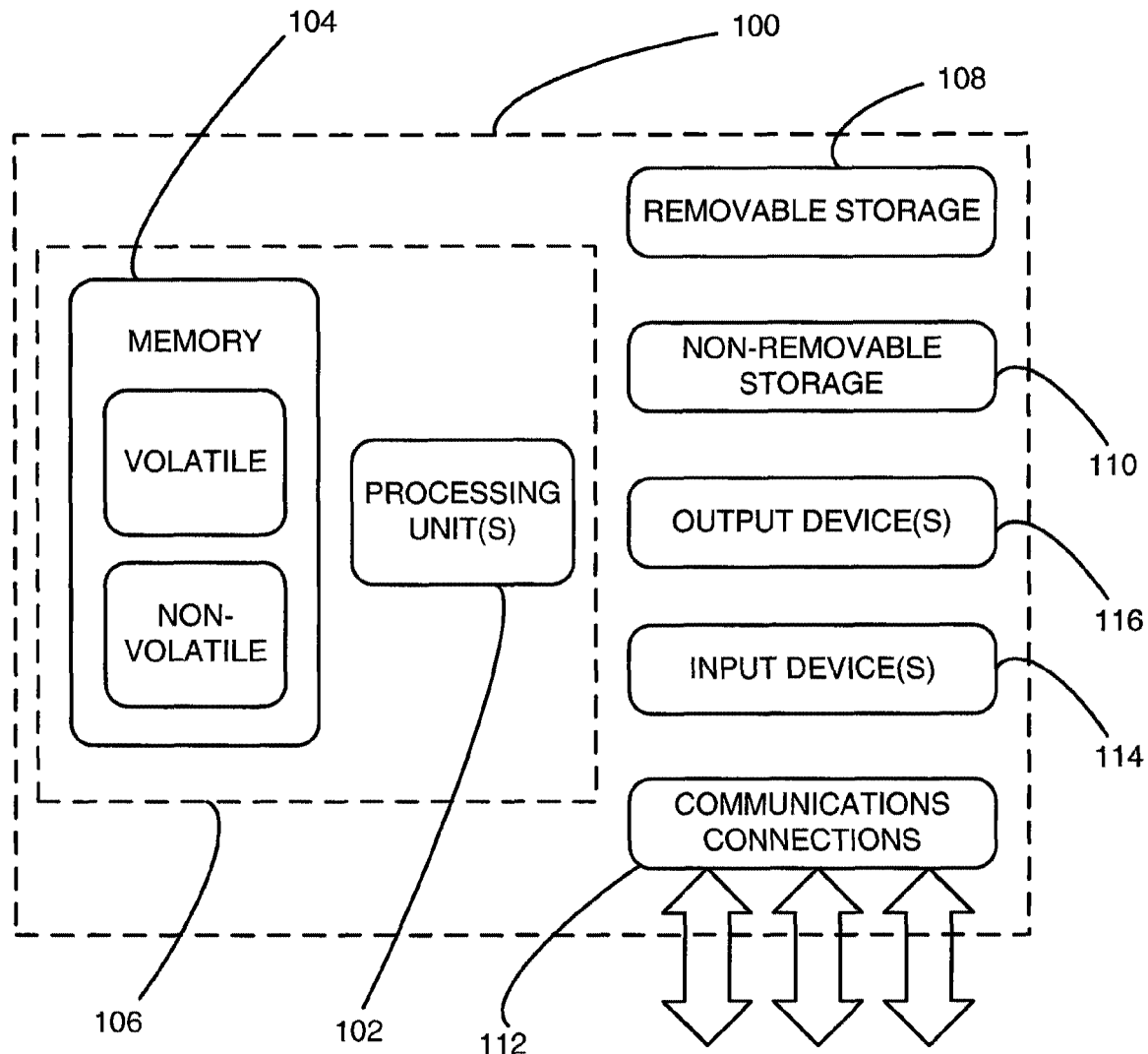
FIG. 1 is a diagram depicting a general-purpose computing device constituting an exemplary system for implementing the present invention.

FIG. 1 illustrates an example of a suitable computing system environment 100 on which the invention may be implemented. The invention may be described in the general context of computer-executable instructions, such as program modules, being executed by a computing device. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a computing device, such as computing device 100. Examples of well known computing devices, systems, environments, and/or configurations that are suitable for use with the invention include, but are not limited to, personal computers, server computers, hand-held, laptop or mobile computer or communications devices such as cell phones, Pocket PC's and PDA's, multiprocessor systems, microprocessor-based systems, set top boxes, programmable consumer electronics, network PCs, minicomputers, mainframe computers, distributed computing environments that include any of the above systems or devices, and the like.

In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration, as illustrated in FIG. 1 by dashed line 106, can be understood to represent any of personal computers, server computers, hand-held, laptop or mobile computer or communications devices such as cell phones, Pocket PC's and PDA's, multiprocessor systems, microprocessor-based systems, set top boxes, programmable consumer electronics, network PCs, minicomputers, mainframe computers, distributed computing environments, servers, routers, a network PC, a peer device or other common network node.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100. Device 100 may also contain communications connection(s) 112 that allow the device to communicate with other devices.

Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The term computer readable media as used herein includes both storage media and communication media. Device 100 may also have input device(s) 114 such as keyboard, mouse, pen, voice input device, touch input device, camera, etc. Output device(s) 116 such as a display, speakers, printer, etc. may also be included. All these devices are well known in the art and need not be discussed at length here.

The computing device 100 may operate in a networked environment using logical connections to one or more remote computing devices for retrieving and/or receiving information as described in the following sections. The remote computing devices may include, but are not limited to, personal computers, server computers, hand-held, laptop or mobile computer or communications devices such as cell phones, Pocket PC's and PDA's, multiprocessor systems, microprocessor-based systems, set top boxes, programmable consumer electronics, network PCs, minicomputers, mainframe computers, distributed computing environments, servers, routers, a network PC, a peer device or other common network node, and typically includes many or all of the elements described above relative to the computing device 100. The communications connections 112 depicted in FIG. 1 include a local area network (LAN), a wide area network (WAN), or other wired or wireless networks. Such networking environments are commonplace in offices, enterprise-wide computer networks, intranets and the Internet.

When used in any networking environment, the computing device 100 is typically connected to the network through a network interface or adapter, a modem, or other conventional means for establishing communications over the network. It will be appreciated that the network connections discussed here are exemplary and many other means of establishing a communications link between computing devices may be used.

Figure 2:
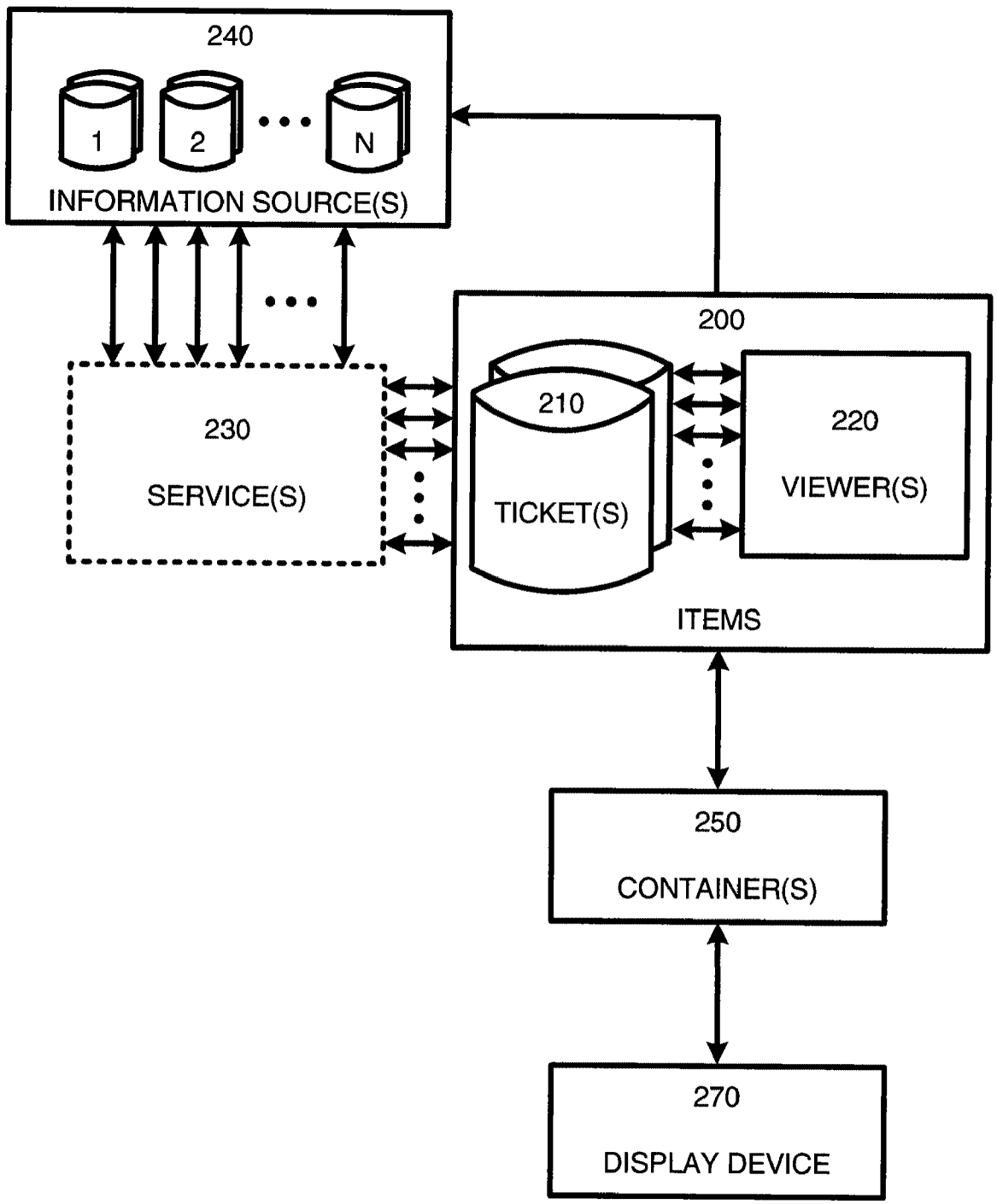
FIG. 2 is a general architectural diagram illustrating exemplary system components for implementing a system and process in accordance with the present invention.

The exemplary operating environment having now been discussed, the remaining part of this description will be devoted to a discussion of the system and process of the present invention, components of the present invention, exemplary program modules and processes for implementing the present invention, an exemplary user interface according to the present invention, and a working example for illustrating the present invention. In particular, the system and process of the present invention will first be described with respect to FIG. 2. FIG. 2 represents a high level general architectural diagram illustrating exemplary system components for implementing a system and process in accordance with the present invention. Exemplary program modules for implementing a system and process according to the present invention will then be described with reference to the exemplary system diagram of FIG. 3. Next, exemplary processes for automatically providing peripheral awareness of contacts and information of interest to a user via a peripheral awareness interface will be described with reference to the flow diagram of FIG. 4A. In addition, an exemplary user interface will be discussed with reference to the block diagram of FIG. 5. Finally, several working examples of the present invention will be described with reference to the exemplary screen images of FIGS. 6-13.

2.0 System Overview

Currently, typical users have a variety of different applications, devices, and services which they use daily. However, because such technologies do not work seamlessly with one another, users are forced to adapt to each technology rather than having the different technologies either adapt to the user or work together on the user's behalf. In particular, one central idea of modern computing involves not simply working with particular applications or from particular devices, but instead working or communicating with people or other entities, i.e., contacts, and with information from any of an almost infinite number of sources. However, access to communication with people or other entities tends to be buried in one or more user interfaces or applications, while access to particular information is also buried or spread out among a plurality of applications, user interfaces, or unrelated sources.

The present invention addresses these issues along with a host of other problems left unsolved by conventional communication and information access schemes by providing an integrated dynamic peripheral interface for providing dynamic communication access and information awareness across multiple platforms in a non-obtrusive manner, i.e. in a "peripheral awareness interface." This peripheral awareness interface provides a user with dynamically updated status, availability, and state of any number of communications contacts and of particular types or sources of information. Such communications contacts and information of interest includes, for example, when entities such as people, businesses, or organizations are free to communicate, when shared files or folders are modified, when information in a shared database or workspace changes, email status, calendars, Internet web pages, weather conditions, appointments, schedules, statistical information, stock quotes, traffic information, or any other information that may be of interest to a user. Further, in one embodiment, as discussed below, and described in further detail in Section 3.2, particular elements of the dynamic communication access and information awareness are user-accessible from any of a number of devices having Internet or other network access. Such devices include computers residing in different locations, i.e., home, office, etc., handheld devices such as palm-top or handheld computing devices, personal organizers, cell phones, or any other Internet or network enabled device.

In the context of the present invention, the concept of "peripheral awareness" is best explained by the following discussion. In general, the peripheral awareness interface of the present invention takes advantage of people's innate ability to receive information about the world around them without significantly interrupting their focal tasks. One trivial example of this innate ability of people to perceive information in a peripheral manner without interrupting their focal task is that a person might overhear a discussion in the hallway between Bob and Jane and realize that Jane has returned from her vacation. The present invention takes advantage of this ability with the peripheral awareness interface. Such peripheral awareness interfaces are always on and visible rather than being a discrete user interface event that is shown when there is a state change of some information. Thus, peripheral awareness, in accordance with the present invention does not blatantly draw the user's attention to new or updated information immediately, but instead makes it available in the periphery so that it may be observed if and when the user decides to glance that way. Further, in one embodiment, to increase the effectiveness of user notification, the peripheral awareness interface utilizes both strategies of peripheral awareness and notification, i.e., audible and/or visible alert, depending upon the time sensitivity or priority of the information.

Further, with respect to communications contacts, the system and method of the present invention provides a "person-centric interface" for interacting with communications contacts. This person centric interface is designed such that people or other entities are brought to the forefront of the peripheral awareness interface so that communications with particular persons or entities may be reviewed or initiated easily, while the communications availability of such people or entities may be understood by a user by simply glancing at the peripheral display. This capability is accomplished by displaying pictures, images, icons, avatars, etc., or some combination thereof, within each item which represents a particular communications contact. These graphical representations serve to visually represent the communications availability or status for each communications contact using conventional social queues to indicate contact availability or status.

For example, in one embodiment, a frontal close-up of an image of a person, i.e. an image of the person looking at the user, is used to indicate that the person is available for communication, while a profile image of the person, i.e., the person looking away to one side, is used to indicate that the person is busy or otherwise unavailable for communication. Consequently, merely glancing at any such image can serves to immediately inform the user whether particular contacts are available for communication. This example is but one of many possible implementations of using graphical representations for indicating communications status and availability. These concepts are described in further detail below.

In general, the present invention can be described as providing dynamic communication access and information awareness in an integrated interactive peripheral awareness display within which specified communications contacts and informational elements are dynamically tracked or received and provided to a user on an ongoing basis. In a tested embodiment, this capability is provided via at least one customizable dynamic thumbnail displayed in one or more columns in a persistent display strip along one edge of a conventional display device. Further, in additional embodiments, the thumbnails are displayed on one any portion or portions of a display, including the entire display. The embodiment wherein the entire display is covered is particularly useful where the system and method of the present invention will be used on a device having a relatively small display area, such as, for example, a handheld or palm top computing device, a cell phone, or any other electronic device having a limited display area. For example, see FIG. 6C.

Each of the customizable dynamic thumbnails represents either particular communications contacts, such as, for example, particular individuals, businesses, organizations, or other entities, or particular elements of information that a user may be interested in. Such information elements include, for example, when shared files or folders are modified, when information in a shared database or workspace changes, email status, calendars, Internet web pages, weather conditions, appointments, schedules, statistical information, stock quotes, traffic information, or any other Internet or network accessible information that may be of interest to a user.

The aforementioned dynamic thumbnails or "items" generally comprise a combination of a "ticket" describing the contact or information of interest and a specialized "viewer" for displaying whatever communications contact or information is represented by the ticket. The system and process of the present invention then uses one or more "services" to automatically interact with, track, or receive the current state of the information and/or status of the communications contacts described by each ticket. The current state of the information and the status of the communications contacts are then dynamically provided by hosting each "item" in a "container" residing within an interactive "peripheral awareness" interface for graphically and/or textually displaying the items. The peripheral awareness interface displays information and/or communications contacts in such a way as to minimize any potential distraction or interruption to the user.

In general, a ticket is represented by a data structure such as an XML data file. Each ticket includes instructions as to what information or communications contact is to be represented by the ticket as well as pointers to particular "services" that represent any of a number of conventional means for accessing and/or interacting with the information or communications contacts. These services are automatically or manually selected from a predefined or user definable library of services. In particular, the different services represent shared code or functions that provide functionality for accessing, receiving, retrieving, and/or otherwise interacting with any conventional information, source of information, or communications contact. These services are shared in the sense that they are used either alone, or in combination, and may be used simultaneously by one or more tickets. Consequently, it should be noted that in one embodiment multiple services are used in combination for providing complex interactions with any conventional information, source of information, or communications contact.

In the context of the present invention, one example of a "service" is the functionality necessary for monitoring an email folder by connecting to a conventional MAPI server. Another example of a service is functionality for sending or receiving email messages. Related services provide functionality for communicating with contacts or transferring information via any number of conventional methods, such as, for example instant messaging or peer-to-peer communications schemes. Another example of a service is functionality to convert a text file from one language to another. A further example of a service is functionality necessary for monitoring a database. Still other examples of services include functionality for receiving or retrieving data from a web site or a remote server. Clearly, any conventional method for interacting with any conventional information, source of information, or communications contact can be implemented as a shared service for use by one or more tickets in accordance with the present invention.

Further, as noted above, each ticket's instructions includes a pointer to one of a number of specialized "viewers" having the capability to display whatever type of information or communications contact is represented by the ticket. In other words, each ticket represents a combination of the information or contact that a user desires to keep track of along with a definition of how the user desires to view that particular information or contact as well as the ability to use any of a number of conventional means, i.e., services, for accessing and interacting with the information or contact. Such access or interaction can be accomplished locally, or across local intranets, extranets, wired or wireless networks, the Internet, etc. via any conventional communications protocol.

As discussed above, each ticket is paired with a "viewer" to create an "item." These viewers graphically display the ticket as a resizable thumbnail or icon-sized window having the information or contact data retrieved via one or more of the services in accordance with the aforementioned ticket instructions. In particular, the viewer is capable of dynamically displaying a ticket having textual, audible, or graphical information, including still or live images, or any combination of textual, audible, or graphical information. For example, one viewer type is capable of displaying contact information, i.e. a "person ticket" as described below, another is capable of displaying specific email information, such as, for example, number of messages received, or number of messages from a particular source, another viewer is designed to interact with a database to provide a summary of particular information from the database in the thumbnail. Further examples of viewer types include viewers capable of displaying still images, video images, a summary of communications status, the results of a database query, etc. Clearly, any type of viewer can designed to be associated with any corresponding type of information to ensure that any possible information can be displayed.

As noted above, the "items," i.e., the ticket/viewer pairs, are hosted by "containers" having the capability to host any number of items. These containers are described in further detail below (see Section 2.1.4), but can be thought of, at least in a general sense as a region provided on a display device where items can be placed, displayed or rendered, and within which users can interact with the items. Further, these containers provide common services for tickets and items, such as, for example, allowing tickets or items to be placed in the containers, allowing items to be moved into and out of the containers, or arranged within the containers, and ensuring that items within containers are not covered by other application windows. Again, as noted above, particular containers are capable of hosting any number of items. Further, also as described in detail below, any number of containers may exist concurrently on a given display device. In a tested embodiment, the peripheral awareness interface described herein is represented by a container that forms a "sidebar." This sidebar can be generally described as a container hosting one or more columns of items in a persistent interactive display strip along one edge of a conventional display device.

The containers are user accessible via a peripheral awareness user interface. Users can interact with this user interface using any conventional pointing device, keyboard, etc., that is appropriate for whatever device is being used to display the items in the containers as described herein. Further, each item, whether representing a contact, an email folder, or any other information of interest, is preferably actionable. Consequently, selecting or otherwise interacting with any item via any of a number of conventional input devices, such as, for example, mouse, keyboard, stylus, touchpad, etc., serves to initiate particular actions appropriate to a given item, as described below, such as to instantiate context sensitive menus or item-specific information or tooltip type windows.

For example, assuming an email ticket for watching an email inbox folder, a summary of the number of messages received in the folder is preferably displayed in the thumbnail, i.e., the item which is being hosted by the container. Further, clicking on, or hovering a pointing device over the email item serves to bring up an email pop-up window including the contents of the email inbox folder being tracked/watched in accordance with the email ticket instructions. As described in further detail below, the user may interact with any message in this window in the same manner as if the messages with being accessed or viewed within the users' email application. In other words, given this example, the user can read the message, forward, delete, or reply to the message, or perform any other conventional messaging type action on the message from directly within the email pop-up window. This functionality is achieved either by providing an email specific viewer having the desired email functionality, or by providing a viewer that instantiates an instance of the users email program for purposes of displaying the tracked/watched inbox folder.

In addition to the overview of the invention summarized above, many additional features are described below as alternate embodiments in accordance with the present invention. Further, each of the features of the present invention that have been summarized above is discussed in greater detail in the following paragraphs.

2.1 System Components:

FIG. 2 is an exemplary architectural diagram which illustrates basic components for implementing a peripheral awareness interface system and process in accordance with the present invention. It should be noted that the boxes and interconnections between boxes that are represented by broken or dashed lines in FIG. 2 represent alternate embodiments of the present invention, and that any or all of these alternate embodiments, as described throughout this document, may be used in combination. In general, specifying, tracking or receiving, and providing the status of communications contacts and information of interest is accomplished through the use of at least one customizable dynamic encapsulated object, hereinafter to as a "ticket," 210 that when paired with a "viewer," 220, provides peripheral awareness of information and communications contacts of interest to a user via a container 250 for implementing the peripheral awareness interface of the present invention on any conventional display device 260.

A system and process according to the present invention includes four basic components: 1) One or more tickets 210 which describe what is to be tracked or watched, where and how the data or contact information can be found, and what type of viewer 220 is appropriate for viewing whatever is to be tracked or watched; 2) Zero or more services 230 representing the means, i.e., where and how, by which information or contacts are tracked or otherwise watched; 3) One or more viewers 220 from a predefined or user definable or editable library of viewers, each viewer having the capability to display particular tickets 210 within a container 250; and 4) one or more containers 250 for hosting ticket/viewer pairs, i.e., "items" 200, the containers representing peripheral awareness interfaces residing on one or more display devices 260.

In particular, as illustrated by FIG. 2, "items" 200 comprising pairs of "tickets" 210 and "viewers" 220 optionally make use one or more "services" 230 to dynamically track, interact with, and/or watch one or more particular information sources 240. It should be noted that as described below (see Section 2.1.3) the viewers 220 comprising a portion of the items 200 may contain ActiveX® or other types of controls that directly make HTTP or other communication calls without the need for using services 230. Consequently, as noted above, the items 200 optionally use one or more "services" 230. By dynamically tracking or watching particular sources of information 240, a current status of any particular information or communications contact is provided to the user. This information or contact status is provided either graphically, textually, or via some combination thereof, by hosting one or items 200 within one or more containers 250 for providing peripheral awareness interfaces on one or more display devices 260.

2.1.1 Tickets:

In general, a ticket 210 is a combination of the information or contact that a user desires to keep track of along with a definition of how the user desires to view that particular information or contact. The term "ticket" 210 is used herein to describe an extensible markup language (XML) structure, or similar language structure that defines the content of an item 200 within the container 250, such as a "sidebar" described in further detail below. In particular, a ticket 210 consists of two portions: one that is common to all types of items, including, for example, a control name, CLSID of an ActiveX® (or other scripting language) control associated with the ticket, a URL or file path for where to obtain the code or script control if it is not locally installed, etc.; and one that varies based on the type of the ticket, including parameters specific to that ticket type, such as, for example, what type of viewer 220 is required to display the information or contact defined by the ticket. While tickets 210 in accordance with the present invention use ActiveX® controls, it should be appreciated that many other scripting languages may be used to create controls or instructions in place of ActiveX® controls.

In particular, tickets 210 can be described as the individual controls hosted with a viewer 220 in the container or sidebar 250. These tickets 210 can be created using any one of a number of conventional programming or scripting languages, including, for example, ActiveX®, C++, Visual Basic, and DHTML plus JavaScript. However, as described below with respect to containers 250 (see Section 2.1.4), regardless of which language is used to create the tickets 210, the tickets preferably support specific interfaces or specifications required by the container so that the container can successfully manage the items 200 comprised of the ticket/viewer pairs.

Exemplary ticket 210 types include, for example, communications contact tickets (i.e., person tickets) as described in further detail below in Section 5.0, email tickets, calendar or scheduling tickets, file system or file folder tickets for watching particular directories or files, stock tickets for watching information relative to particular stocks, database tickets for watching particular databases or parts or summaries of such databases, web page tickets for watching Internet or network web pages or portions thereof, weather tickets for watching or tracking weather information, traffic tickets for watching traffic information for particular locations, etc. Clearly, any type of contact or information which is accessible via the Internet or any other network or communications method may have an associated ticket 210 for watching or tracking that contact or information.

For example, particular information of interest to a user may be statistical information relating to a particular electronic file. Given this trivial example, the user may be interested in knowing how many people have read the electronic file, or whether it has been modified. Consequently, the customizable ticket 210 for watching or tracking the electronic file that the user is interested in includes instructions for using one or more of the services 230 for linking or connecting to the electronic file, i.e., one of the information sources 240, via any of a number of conventional electronic communications methods. Further, where the electronic file of interest resides locally, on the user's own computer, for example, the ticket 210 may include instructions for accessing, watching or tracking the file information directly without requiring the use of a service 230.

Either way, in accordance with the aforementioned example, the ticket 210 includes instructions for using conventional electronic communications methods for dynamically collecting statistical information relative to the electronic file as it becomes available. Further, as described above, the ticket 210 also includes instructions for how to display particular information, as well as what type of viewer 220 is to be used for displaying that information within the container 250. One example of such instructions includes instructions to display the number of people that have read the file, and/or instructions to change the color of the displayed information when the file has been modified by anyone other than the user. Additionally, as described in further detail below, in one embodiment, such display instructions are user configurable so that a user can display the desired information in a format of the user's choice.

Another useful feature of tickets 210 is that, in one embodiment, tickets are shareable between users. Consequently, tickets 210 may be shared via email, or via any other means for transferring electronic files. For example, tickets 210 may be copied, cut, pasted, stored, saved, transferred, transmitted, etc., like any other electronic file using conventional techniques. In a related embodiment, tickets 210 can be posted on web sites then copied and pasted or dragged and dropped to the container 250, or to any other location on the display device 260. As described in further detail below (see Section 4.0), in one embodiment, pasting or dragging and dropping tickets 210 onto the display device 260 serves to automatically call up a wizard or similar application window for providing the user with a choice of either instantiating an instance of a container 250 for hosting an item 200 comprising that ticket 210 and an associated viewer 220, or simply copying the ticket as any other electronic file.

Further, also as described in further detail below, tickets 210 can be stored in user profiles or databases or any other computer readable media to be accessed via any of the user's Internet or network enabled devices, or shared by colleagues, customers, friends and family, etc. of the user by simply copying or manually or automatically transmitting the ticket or tickets to whatever computing device a user wishes the ticket to be hosted on. In addition, users can manage the tickets 210 such as by adding, editing, or deleting tickets via a user interface as described below.

2.1.2 Services:

As noted above, services are automatically or manually selected from a predefined or user definable library of services. As noted above, zero or more "services" 230 are used for interacting with particular communications contacts or information of interest. Current information or status is automatically either retrieved or received, i.e., either by "pulling" or "pushing" such information, from any one or more of a number of conventional communications sources 240 by using the functionality associated with one or more services 230. By way of example, such information sources include local file servers, email servers, MAPI servers, file transfer services, electronic databases, electronic files, instant messaging or other peer-to-peer communications schemes, or any other possible source of electronic data. However, as noted above, services 230 are not limited to merely providing communications to one or more sources of information.

In particular, the different services 230 represent shared code or functions that provide functionality for accessing, receiving, retrieving, and/or otherwise interacting with any conventional information, source of information, or communications contact. These services 230 are shared in the sense that they are used either alone, or in combination, and may be used simultaneously by one or more tickets. Consequently, it should be noted that in one embodiment multiple services 230 are used in combination for providing complex interactions with any conventional information, source of information, or communications contact.

Consequently, as described above, in the context of the present invention, one example of a "service" 230 is the functionality necessary for monitoring an email folder by connecting to a conventional MAPI server. Another example of a service 230 is functionality for sending or receiving email messages. Related services 230 provide functionality for communicating with contacts or transferring information via any number of conventional methods, such as, for example instant messaging or peer-to-peer communications schemes. Another example of a service 230 is functionality to convert a text file from one language to another. A further example of a service 230 is functionality necessary for monitoring a database. Still other examples of services 230 include functionality for receiving or retrieving data from a web site or a remote server. Clearly, any conventional method for interacting with any conventional information, source of information, or communications contact can be implemented as a shared service 230 for use by one or more tickets 210 in accordance with the present invention.

Consequently due to the wide variety of possible information sources 240, in combination with the virtually limitless types of information available, each ticket 210 independently specifies which services 230, if any, i.e., which particular methods, protocols, communications channels or devices, are to be used for connecting with, and/or interacting with, the information source or sources 240. For example, different communications methods, such as those described above, are required for obtaining information about each of a local file system, connecting to a corporate database, getting people's status information from a messaging service such as that provided by MSN™, and getting secure financial data from a user's bank's Internet web site. Consequently, the service 230 associated with each of these exemplary data types requires different methods of communication for downloading and/or interacting with the requisite data. Again, as noted above, the services 230 can be any conventional method or protocol for completing communications between two or more electronic devices.

Consequently, with respect to the services 230, it is clear that the infrastructure of the present invention must consider how items 200, i.e., ticket viewer pairs (210/220), communicate or interact with a particular information source or sources 240 so that such items can successfully retrieve, receive, or interact with information from any such sources. Additionally, in one embodiment, particular services 230 may be used by more than one item 200, thereby minimizing any required bandwidth. For example, where two or more items 230 must access the same database, i.e., multiple MAPI connections to an email store, or make an Internet connection to either retrieve or receive data, a single connection may be sufficient to provide for multiple tickets. In other words, wherever possible, the load is aggregated to avoid duplicative communications connections so as to limit any unnecessary use of bandwidth.

2.1.3 Viewers:

As discussed above, each of the tickets 210 is paired with a "viewer" 220. These viewers 220 graphically and/or textually display the ticket 210 within the container 250 as a resizable thumbnail or icon-sized window that includes the information retrieved in accordance with the aforementioned ticket instructions. In particular, the viewer 220 is capable of dynamically displaying a ticket 210 having textual, audible, or graphical information, including still or live images, or any combination of textual, audible, or graphical information.

As noted above, each ticket 210 includes instructions as to which viewer is to be used for displaying the communications contact or information represented by the ticket. For example, one viewer type is capable of displaying contact information, i.e. a "person ticket" as described herein, another is capable of displaying specific email information, such as, for example, a number of messages received, or a number of messages from a particular source or contact, another viewer is designed to interact with a database to provide a summary of particular information from the database in the thumbnail. Further examples of viewer types include viewers capable of displaying still images or video, of processing and displaying the results of a database query, of displaying and interacting with email, extracting and displaying particular elements of a web page, etc. Thus, in one embodiment, the viewer 220 is actually one of a set or library of specialized viewers that are each designed to display particular types of data, contacts, or information. However, in another embodiment, the viewer 220 is implemented as a "multi-viewer" which is in essence an aggregation of individual viewers. These "multi-viewers" are useful for displaying information relating to an aggregation or grouping of tickets 210 in a single thumbnail type view within the container 250. Note that both the concept of groups or aggregations of tickets, and the use of multi-viewers are discussed below in Section 6.0 with reference to FIGS. 11A and 11B in the context of a working example. In either embodiment, the viewer(s) 220 are capable of displaying any corresponding type or types of data, communications contacts, or other information within the container 250.

The viewer 220 typically includes the following functions: first, the viewer shows the most relevant states of the contact or information being observed in accordance with the ticket 210 instructions (e.g., the most current information, and/or the most important parts of the information that can be displayed within the ticket thumbnail); and second the viewer automatically displays the information within the thumbnail in such a way as to maximize the use of the space allotted to the thumbnail. Further, as noted below, the container 250, and the thumbnail contained therein is resizable in one embodiment. Consequently, in one embodiment, as the thumbnail is resized, the viewer automatically detects the size or available area of the thumbnail and dynamically provides whatever information can fit into the thumbnail on a priority basis, i.e., the most important parts of the information are displayed first, with less important information being displayed as space permits.

For example, where a container 250 having a stock quote item 200, i.e. a stock quote ticket/viewer pair (210/220), is resized, either more or less information relating to particular stock trades will be displayed. In particular, assume that the most important information that the stock item is designed to provide is a current stock price, day high and low, and trade volume, with the current stock price being most important, and trade volume being least important. Given these assumptions, if the as the container is reduced in size from a point where the thumbnail includes each of the aforementioned information elements, i.e., price, range, and volume, the thumbnail will be reduced in size, and the trade volume information will be removed from the thumbnail as the size of the thumbnail is decreased. As the size of the thumbnail is further decreased, the price range information of the stock will be removed from the thumbnail.

Clearly, in view of this trivial example, many levels of information can be associated with any given item 200 such that as the thumbnail representing that item is either enlarged or reduced in size, as described above, information will either be automatically added or removed, space permitting.

Further, in the spirit of providing peripheral awareness as described herein, one embodiment of the viewer 220 is capable of automatically changing the appearance of graphically displayed tickets 210 over time in order to unobtrusively alert a user as to changing information or communications state or status. For example, in one embodiment, where a ticket 210 has new or current information, retrieved from one or more information sources 240 via one or more services 230, that new or current information can be represented in color, or in gray scale, by using high contrast or brightness levels, or by using any conventional type or style of shading or transparency. However, as time passes, and the information becomes less current, the graphically represented ticket 210 may slowly fade to gray scale, or alternately, the contrast or brightness levels may slowly fade to indicate aging of the information. This ability to indicate aging of information applies equally to "disconnected operations," as described below in Section 7.1 where connections to one or more information sources is either degraded or disconnected. In other embodiments, the viewer 220 may also provide audible alerts, visible alerts, or any desired combination of audible and visible alerts. In related embodiments, the user may discontinue or otherwise edit or change individual alerts or types of alerts via the user interface described below.

2.1.4 Containers:

Simply stated, the container 250 hosts peripheral-awareness items 200, i.e., ticket/viewer pairs (210/220). In accordance with the present invention, the container 250 is implemented in one embodiment as a persistent "sidebar" for displaying items 200 along either a portion of the display device 260, or the entire display device. This sidebar is persistent in the sense that it is always on top, while limiting the available display area on the display device 260 with respect to other open applications or windows such that it doesn't obscure portions of any other application windows. However, in other embodiments, the container 250 is not persistent, i.e., it can be covered by one or more application windows, nor does it limit the available display area. Further, in another embodiment, a mixture of both persistent and non-persistent containers 250 may simultaneously reside on a given display 260. In still another embodiment, a conventional "auto-hide" function is associated with one or more containers 250, such that a particular container is not visible until a user moves a pointing device near one edge of a display device 260. In this embodiment, the container 250 is shown when the user moves the pointing an edge of the display 260 where the container resides. The container 250 is then automatically removed from the display when the user moves the mouse away from the container.

As described above, the items 200 represent ticket/viewer pairs (210/220). Consequently, the items 200 include ActiveX® or other scripting language controls which include the instructions as to what information or communications contact is to be tracked, acquired, etc., along with a specialized viewer 220 for displaying that information or communications contact in whatever manner is instructed by the ticket 210. In general, the container 250 specifies the screen area used for displaying items 200 on the display device 260, allows items 200 to be grouped, aggregated, and manipulated spatially via a user interface, as described below. Further, the container is capable of intercepting certain types of events, such as, for example, user interaction with the items, and of passing those events to the ticket 210 controls as appropriate.

There are many ways of implementing the container 250, such as by the use of various conventional scripting languages. For example, in a working embodiment of the present invention, a container/sidebar is implemented via a dynamic scalable window composed of DHTML and JScript with the assistance of a core ActiveX® control. Consequently, in one embodiment, the sidebar uses conventional web browser-based techniques to support dynamic object creation, hosting, and manipulation. This serves to eliminate the need for extensive and complex proprietary code development each time a third party desires to implement a ticket 210 for use with the system and method of the present invention.

Further, in another embodiment, the container/sidebar 250 requires that the aforementioned container controls support predefined interfaces so that each container can manage the items 200 as required by predefined guidelines specified for a user interface as described below. Implementing such guidelines serves to bring consistency to an end-user experience, while ensuring that all tickets 210 will work with any device capable of displaying such tickets when combined with the appropriate viewer 220. Consequently, support of such predefined interfaces serves to ensure compatibility with any third party tickets 210, regardless of the source of those tickets. In other words, the container 250 is designed in such a way as to support all tickets 210 provided to the container, from whatever source, so long as predefined guidelines are followed.

For example, one set of exemplary rules for implementing the tickets 210 is that: 1) the tickets should indicate how much display area or screen real estate they require; 2) the tickets should provide a configuration user interface; 3) the tickets should provide a pop-up window for accessing detailed information, i.e. an "enhanced tooltip," as described below in Section 3.1; and 4) the tickets should also allow the container or sidebar 250 to pass them their context data, i.e. the information of interest.

3.0 System Architecture

Figure 3:
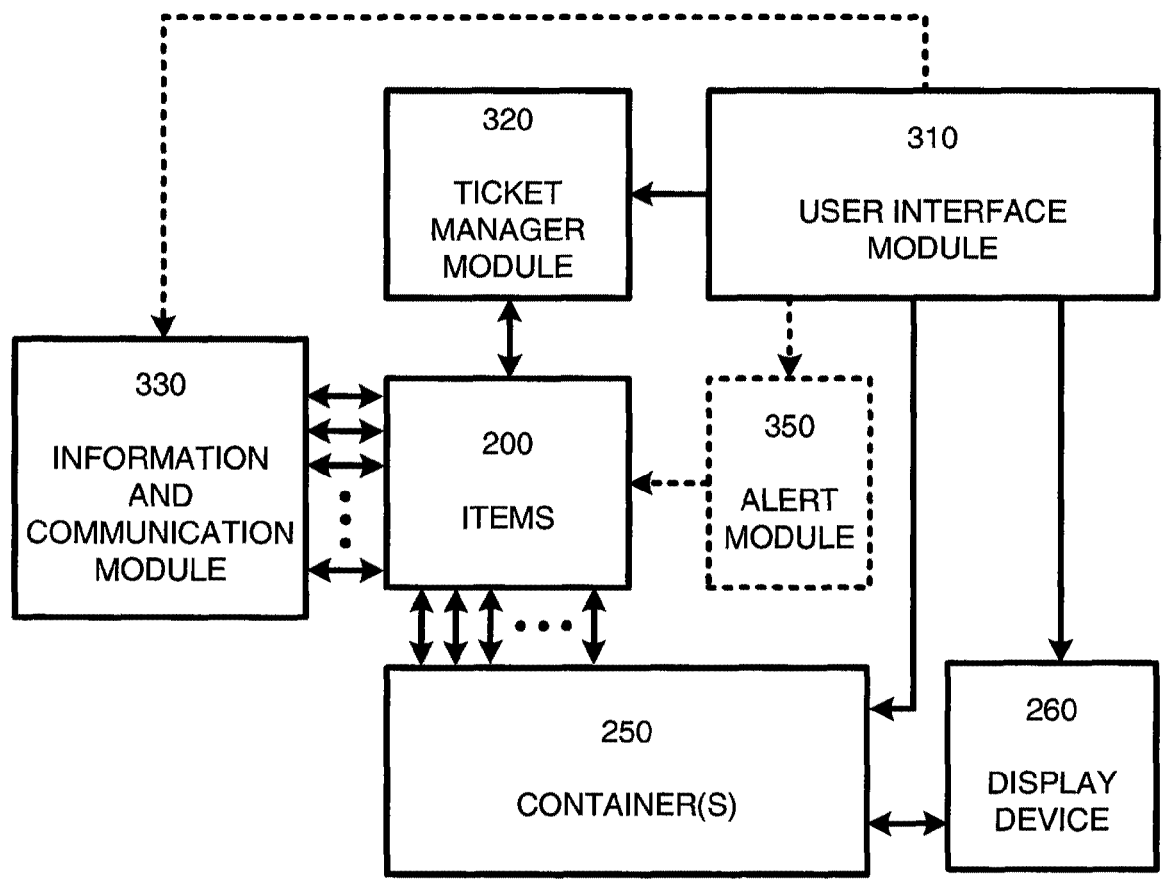
FIG. 3 is a system diagram that depicts program modules employed in a system for providing peripheral awareness of contacts and information to a user via a peripheral awareness interface in accordance with the present invention.

It should be noted that the boxes and interconnections between boxes that are represented by broken or dashed lines in FIG. 3 represent alternate embodiments of the present invention, and that any or all of these alternate embodiments, as described throughout this document, may be used in combination. In general, a system and method according to the present invention uses the program modules illustrated in FIG. 3 for providing peripheral awareness of information and contacts. The program modules of FIG. 3, when considered with respect to the architectural diagram of FIG. 2, illustrate an exemplary system and process for implementing the present invention.

In general, information or contacts of interest to a particular user are identified either automatically by one or more computer program applications in response to user interaction with such application programs, or by the user via a user interface module 310. Once the information or contacts of interest have been identified, tickets representing the information or contacts of interest are created or modified via a ticket manager module 320. In one embodiment, creation or modification of the tickets is accomplished based upon user interaction with the ticket manager module via the user interface module 310. In either embodiment, the tickets are then paired with viewers, as described above, to create items 200.

In another embodiment, creation or modification of tickets via the ticket manager module 320 is automatic once the information or contacts have been identified. Further, in related embodiment, tickets are timed, such that they show up at predetermined or user definable times, for predefined or user definable periods of time. For example, where a user purchases an airline ticket via the Internet, or schedules a flight in his or her calendar or scheduling program, the ticket manager module 320 can automatically create one or more timed tickets that are automatically displayed within a predetermined time of the flight departure time. Such tickets can include many types of information of interest to the user, such as, for example, the current flight schedule, i.e., whether it is on time or delayed, the weather at the flight destination, etc. As the time for the scheduled flight passes, the items representing the timed tickets are automatically removed from the display. In addition, it should be noted that while the automatically created ticket described in this example is a timed ticket, there is no requirement that automatically created tickets be timed.

Once the ticket has been created, paired with a viewer and placed into a container, either manually, or automatically, the system and process of the present invention then automatically tracks or receives the current state of the items 200 via an information and communication module 330 which, in essence, uses one or more of the previously described services for accessing and/or interacting with one or more information sources. Updated information and contact data is then dynamically returned by the information and communication module 330 to the items 200. The items 200 are then hosted by one or more containers 250 which are in turn displayed on the display device 260. Finally, in one embodiment, an alert module 350 provides for visible or audible alerts or notification, or some combination of visible and audible alerts or notification for alerting the user to particular information or contacts, or otherwise indicating a change in the content, status, or age, i.e., how recent or current, for particular information or contacts.

3.1 User Interface Module:

The user interface module 310 is capable of performing several functions using any of a number of conventional input devices, such as, for example, keyboards, pointing devices, voice activated controls, or any other conventional method for interacting with electronic devices such as computers, PDA's, cell phones, personal organizers, etc. These functions will be introduced in the following paragraphs, and will be explained in greater detail with respect to the exemplary user interface described below in Section 5.

In particular, as noted above, one function provided by the user interface module 310 is the capability for the user to specify particular information or contacts of interest via the user interface module. In addition, the user interface module 310 provides for user interaction with items 200 hosted in containers 250 displayed on the display device 260. Such interaction serves to call up actionable expanded information or contact windows, namely "enhanced tooltip windows," that provide further levels of detail beyond that provided by the iconized ticket thumbnail represented by the item 200 hosted in the container 250.

In particular, "enhanced tooltips" can best be described as a large, actionable HTML, ActiveX®, or other script or code based window having extended information. The tooltips are actionable in the sense that, in one embodiment, if a user clicks on or otherwise selects particular information or elements within the tooltip, the tooltip will automatically link to more detailed information for the particular information or contact represented by the item 200. Further, in one embodiment, tooltips may be nested, such that is a user hovers a mouse or other computer pointing device over the particular information or elements within a first tooltip, a second tooltip will pop up with further extended information relating to the particular information or elements within the first or "parent" tooltip. Clearly, any number of levels of nesting may be applied when implementing nested tooltips.

Further, users are also provided with the capability to interact directly with the containers 250 via the user interface module 310. For example user interaction with the containers 250 allows the user control over container properties, such as, for example, container size and position, grouping and aggregation of items within the container, and arrangement or organization of items within the container. Groups or aggregations of items are basically user-defined collections of items within the container or sidebar 250. Grouping can be accomplished in any of a number of ways. First, grouping can be accomplished by simply dragging and dropping one or more tickets onto an existing ticket or group within the container or sidebar 250. When one ticket is dropped onto another, a group is automatically created having both tickets. One a ticket is dropped onto an existing group, the ticket is simply added to the group. Further, one group can be dragged and dropped onto another group. The result is a nested group as described below. Further, tickets and groups can be managed or created via a ticket manager module 320. From an structural perspective, in one embodiment, item groups, or aggregations of items, are simply treated as a container having one or more items embedded within another container (see the discussion relating to FIG. 7B below).

The embedding described above, both with respect to item groups, and enhanced tooltips, can consist of any number of desired levels of embedding or grouping. Each embedded container 250 or sidebar has an associated DHTML table or similar script that contains the individual controls. Like the top-level container 250, the embedded container also handles events (e.g., drag and drop) that are passed to it by the control, and it may choose to handle these events itself or pass them on to its parent container. Further, as the user selects or otherwise activates an item 200 having either a sub-group of items, or a group of one or more embedded containers, that sub-group, or the embedded containers, are automatically opened so that the items or other containers 250 within the group and the information or contacts that they contain are visible and accessible to the user.

The container 250 is scalable via the user interface module 310 using conventional techniques similar to that for resizing any display window, i.e. grab an edge or corner with a pointing device and resize the window, or in this case, the container. As noted above, the container/sidebar 250 described above contains multiple ticket/viewer combinations represented as thumbnails. The viewers associated with each thumbnail automatically scale to accommodate the tickets displayed by the viewer. Consequently, the viewer associated with each ticket automatically scales the thumbnails to fill the available space within the container 250 as the container is resized. This is preferably accomplished in one embodiment by automatically dividing the container into strips, or columns of thumbnails as needed where placing all of the thumbnails in a single strip would result in thumbnails below a predefined minimum size threshold. Additionally, in one embodiment, to ensure a minimum legibility of thumbnails, there is a minimum size below which thumbnails will not be reduced when downsizing the container 250.

Additionally, in one embodiment, the user interface module 310 provides the user with the capability to directly interact with the services provided to the tickets via the information and communication module 330. In particular, in this embodiment, the user may select, copy, create, or edit particular services. Consequently, individual services can be created or customized via the user interface module 310 in order to allow item 200 interactions with unique or non-standard information sources or contacts. However, in a working embodiment of the present invention, the capability to directly interact with the services, such as for creating or editing services as described above, is limited to developers or third party programmers to avoid potential user error that could interfere with proper functionality of any services.

Finally, in another embodiment, the user interface module provides user access to the alert module 350. This access allows the user to customize particular alerts, to turn on or associate alerts with particular tickets, or to turn off or delete alerts associated with particular tickets.

3.2 Ticket Manager Module:

As noted above, the ticket manager module 320 is used for creating, grouping, or modifying particular tickets once the information or contacts of interest have been identified. As noted, tickets may be created by the ticket manager module 320 either automatically, or manually. Further, as described in further detail below, tickets can be created by the ticket manager module 320 via the user interface module 310 through user actions such as dragging and dropping of links, URL's, names, files, file paths, applications, etc., into a container 250.

In addition, in one embodiment, the ticket manager module 320 provides a library of predefined tickets for user selection, modification, or sharing. For example, in one embodiment, a ticket database for individual users is pre-populated with a set of exemplary, fully functional tickets that a user can select from in creating a personal profile of tickets. Such tickets may include, for example, generic person tickets, weather conditions, generic appointment profiles, schedules, statistical information, stock quotes, traffic information, or any other information that may be of interest to a user. Once tickets have been identified, created, modified, etc. the ticket manager module 320 pairs each ticket with an appropriately identified viewer to create the aforementioned items 200.

In another embodiment, the tickets are preferably stored in an Internet or network accessible database. Consequently, users can manage the tickets via the ticket manager module 320, such as by adding, editing, or deleting tickets from the database via the user interface module 310. Additionally, because tickets 350 are sharable in one embodiment, as described above, tickets may be created by third parties and provided to users via any of the methods described above, such as email attachments or via draggable icons in a third party web page. Such third party tickets may include any information elements desired by the third party, such as, for example, advertising information or tracking information for customer or user orders. As with user created tickets, or tickets provided via the ticket library or database, third party tickets are managed via the ticket manager module 320 as with any other ticket.

In a related embodiment, specific tickets that show up on particular devices are automatically determined by the ticket manager module 320 based either on past patterns of use for each device, or by explicitly specifying particular tickets to be used with particular devices via the user interface module 310 and the ticket manager module. For example, tickets relating to communication with entities such as particular individuals, corporations, organizations or businesses, might be used or accessed by the user only from the user's cell phone or PDA, but not from the user's office computer. Thus, the ticket manager module will provide such tickets only to the user's cell phone or PDA display, but not to the user's office computer, even though all of the tickets of the user's personal profile are stored in the same network or Internet accessible database. This embodiment serves to reduce the potential clutter of tickets having little or no utility with respect to particular devices or particular locations.

3.3 Information and Communication Module:

The information and communication module 330 makes use of the previously described services (230 of FIG. 2) for dynamically accessing and interacting with one or more conventional communications sources to dynamically provide current information, including communications status, etc., as described above. Also as described above, this current information is then automatically and dynamically provided in an interactive peripheral display on the conventional display device 260 in such a way as to minimize any potential distraction or interruption to the user. In addition, in further embodiments, as described above, the information and communication module 330 provides a library of predefined services for developer, third party, or user selection or modification. Once services have been either modified or created, they are available for use by the tickets comprising a part of the items 200 as discussed above.

3.4. Exemplary Functions for Implementing a Working Example of the Present Invention:

It should be appreciated by those skilled in the art, that many types of COM interfaces, functions or types of functions can be used to provide the capabilities and functionality described herein. In view of this note, a working example of the present invention, as described in Section 6.0 is implemented using three main interface functions, hereafter termed "Ticket-Interface," "Ticket-Interface-File" and "Tooltip-Interface," additional functionality is also based on standard COM interfaces to support ActiveX® containment and a viewer "Property Page" which represents properties for each viewer. In accordance with this working example, the main display surface for tickets is an ActiveX® container with prescribed interaction and implementation behavior between container and viewer ActiveX® servers, realized by deriving the ActiveX® servers interface contract from Ticket-Interface. Derivation from Ticket-Interface provides size negotiation, ticket file storage accessibility, and interaction support services such as tooltip control, context menus, wizard support, etc. Ticket viewer context data and configuration support is provided through Ticket-Interface-File, exposing an interface for a viewer to access and manipulate its XML ticket file which the container has assigned, and to enable standardized access for a viewer's Property Page user interface to the associated ticket file. Finally Tooltip-Interface ensures a consistent tooltip user experience across ticket viewers and exposes advanced tooltip functionality and behavior for and between the container and each viewer.

Ticket-Interface and "Ticket-Interface-Events" are the primary pair of COM interfaces between the container and viewer server which provides an interface to each viewer. Ticket-Interface member calls are generated by the container either requesting behavior of, or passing data to the viewer server. Ticket-Interface-Events event calls are generated by the viewer server in response to user interface events so as to notify the container for any prescribed behavior that should occur.

In particular, Ticket-Interface-File and Ticket-Interface-File-Events are the pair of COM interfaces that glues a single source of XML data between a viewer, its Property Page, and its container and graphical manifestation. The container sources the XML for the ticket viewer, loads it into a Ticket-Interface-File interface and passes the reference to the ActiveX® viewer. If a viewer requests it's Property Page to be displayed, the same interface reference is passed by the Wizard manager to the COM interfaces, with changes to the XML data committed to the source. Any changes made to XML tags fire a "Field-Change" function (see discussion of particular functions below) indicating the tag that was changed and its new and old data values, so the viewer can adjust accordingly. In this way the viewer and its Property Page are isolated from the location and manifestation of their XML data, and can therefore be situationally and seamlessly changed by the container implementation.

3.4.1 Exemplary Function Examples:

The following paragraphs provide an overview for each of the interface member functions used by the aforementioned COM interfaces for implementing the working example described in Section 6.0.

"Put-Ticket-File" Function—As a container processes a list of ticket files for each of its viewers, it encapsulates the XML ticket file using an Ticket-Interface-File COM interface and passes it to a viewer control using the Put-Ticket-File function so the viewer can access its context and configuration data. This same interface reference is also used by the viewer's Property Page to configure its behavior and operate on the same XML set as the viewer and a container storage model. In this way the viewer is isolated from how or where its ticket file has been sourced.

"Get-Ticket-File" Function—When a new viewer is about to be created the container calls this function in order to get the viewer's default configuration value template, as a Ticket-Interface-File interface, before passing it to a container "Wizard" manager and viewer's Property Page.

"Source" Function—Source is an alternative property based embodiment to set a viewer's Ticket-Interface-File's data content. This property is used when the container is used in a scripted environment and not responsible for managing the location of the Ticket files.

"Get-Source" Function—Get-Source is an alternative property based embodiment to get a viewer's Ticket-Interface-File's location. This property is used when the container is used in a scripted environment and not responsible for managing the location of the Ticket files.

"Get-Width-From-Height" Function—Dependent on the current layout mode of the container this member is called to request from the viewer, its desired height given a width that the container will render it in.

"Get-Height-From-Width" Function—Dependent on the current layout mode of the container this member is called to request from the viewer, its desired width given a height that the container will render it in.

"Get-Best-Height" Function—Dependent on the current layout mode of the container this member is called to request from the viewer, its ideal Height that it would like to render its contents within.

"Get-Best-Width" Function—Dependent on the current layout mode of the container this member is called to request from the viewer, its ideal Width that it would like to render its contents within.

"Get-Min-Width" Function—Dependent on the current layout mode of the container this member is called to request from the viewer, its minimum Width that it can render its contents within.

"Get-Min-Height" Function—Dependent on the current layout mode of the container this member is called to request from the viewer, its minimum Height that it can render its contents within.

"Show-Details" Function—When a container has determined that a viewer should display its view with the highest level of detail, this member function is called.

"Show-Tooltip" Function—When a container has determined that a viewer should display its tooltip this member function is called. The viewer would determine how large to display the tooltip, call an "Activate" function on its Tooltip-Interface interface that it has obtained for it.

"Hide-Tooltip" Function—When a container has determined that a viewer should hide its tooltip this member function is called. The viewer would call the Activate function on its Tooltip-Interface interface that it has obtained for it.

"Context-Menu" Function—When a container has determined that a viewer should display its context menu this member function is called.

"Get-Property-Page" Function—When the container needs to display the Property Page for a given viewer, this property function call returns the program ID's for a viewers Property Page interfaces. In this way the container Wizard manager can instantiate the relevant dialogs according to the COM specification.

"Get-Start-Page" Function—After a call to the "Get-Property-Page" function the viewer can determine which of its Property Page should be displayed initially when the Wizard is invoked. For example, in this way a different user interface can be presented to the user based on whether this is a modification to an existing viewer instance, or a new one.

"Get-Next-Page" Function—During the Wizard's navigation of a viewer's Property Page, the viewer can determine which Property Page should be displayed when a Next button is pressed, based on the current state of its Ticket-Interface-File data contents. For example, based on a set of radio buttons different user interface may be required for each state.

"Get-Back-Page" Function—During the Wizard's navigation of a viewer's Property Page, the viewer can determine which Property Page should be displayed when the Back button is pressed, based on the current state of its Ticket-Interface-File data contents. For example, based on a set of radio buttons different user interface may be required for each state.

"Finish" Function—Given that the ordering of Property Page could be arbitrary and that a Finish button can be enabled choosing default values for other user interfaces, this property call is invoked by the Wizard manager to determine whether the Finish button should be enabled given the current state of the Ticket-Interface-File data contents.

"Do-Ticket-Interface" Function—A viewer can optionally provide functionality through the Do-Ticket-Interface member function, this is particularly useful in scripted environments to invoke additional user interface or perform actions. The author of a viewer would publish the verbs and their parameters that are exposed.

"Double Click" Function—The viewer should fire the Double Click event when it has been double clicked with the mouse. This is usually interpreted by the container to call the Show-Details function.

"Mouse Action" Function—The viewer should fire the mouse events when mouse messages occur. This enables the container to make decisions about tooltip control, context menu display etc.

"Resize" Function—If a viewer wishes to display more information in its thumbnail it can fire this event so that the container can rearrange the surface to try and accommodate the real estate change request.

"Remove" Function—A viewer can request to be permanently removed from the container by firing this event, usually in response to a Remove context menu selection.

"Request" Function—A viewer can request the container to display its Property Page by firing this event, usually in response to a Properties context menu selection.

"Verb" Function—A container can optionally provide functionality through the Verb member function. The author of a container would publish the verbs and their parameters that are exposed.

"Load" Function—Loads a given XML source file into the XMLDOM document that Ticket-Interface-File encapsulates. Once the file has been loaded each XML tag is signaled invoking a Field-Change function event so that the viewer can act accordingly.

"Put-XML" Function—Loads given XML source text into the XMLDOM document that Ticket-Interface-File encapsulates. Once the text has been loaded each XML tag is signaled invoking a Field-Change function event so that the viewer can act accordingly.

"Get-XML" Function—Returns the XML text to the caller, that XMLDOM document that Ticket-Interface-File encapsulates.

"Get-Field" Function—Returns a specified XML tag's contents to the caller.

"Put-Field Function—Sets a specified XML tag's contents, the change invokes a Field-Change function event so that the viewer can act accordingly.

"Get-URL" Function—Returns a source location for the XML document to the caller.

"Duplicate" Function—Returns a duplicate copy of the XML data encapsulated in a new Ticket-Interface-File interface. Any changes made to the copied interface are transient until a "Save" function is invoked specifying a new source.

"Save" Function—Commits the XML data to its source, using either the loaded source reference or a new source reference.

"Signal" Function—Causes the invocation of a Field-Change function for each XML tag in the document.

"Remove-Field" Function—Causes the removal of a specified XML tag from the document.

"Field-Change" Function—This event is fired when the contents of a specific XML tag has been changed, specifying the tag path, the old and new values of the tag contents.

3.4.2 Exemplary Tooltip Function Examples:

The following functions are related to tooltips. Further, as noted above, it should be appreciated by those skilled in the art, that many other COM interfaces, functions or types of functions can be used to provide the capabilities and functionality described herein. The Tooltip-Interface function ensures a consistent tooltip experience across differently authored viewers, such as tooltip placement, framing and visibility control, in addition to offering other advanced features. Specifically, the following member functions are used to provide the tooltip functionality described herein.

"Create-Tooltip" Function—Called by a viewer, creates and returns a Tooltip-Interface interface instance for use by the viewer.

"Create" Function—Causes the actual creation of the tooltip window and binding it to the viewer to which it belongs, specifying style flags and a Win32 window callback procedure so that the viewer can implement its tooltip functionality.

"Update-Size" Function—Changes the size of a tooltip while it is in the visible state. Ordinarily the Activate function specifies the size of the tooltip when it is displayed.

"Activate" Function—Controls the visibility of the viewer's tooltip based on the state of the Activate parameter. If the tooltip is being made visible the width and height parameter specify the size of the tooltip.

"Tooltip-Sibling" Function—This function adds a popup window to the list of windows that specify the viewer's tooltip bounding rectangles. This ensures that movement into a Tooltip's sibling windows doesn't cause the tooltip to actually be dismissed.

"Remove-Sibling" Function—This function removes a popup window from the list of windows that specify the viewer's tooltip bounding rectangles (see above).

4.0 Operation

Figure 4A:
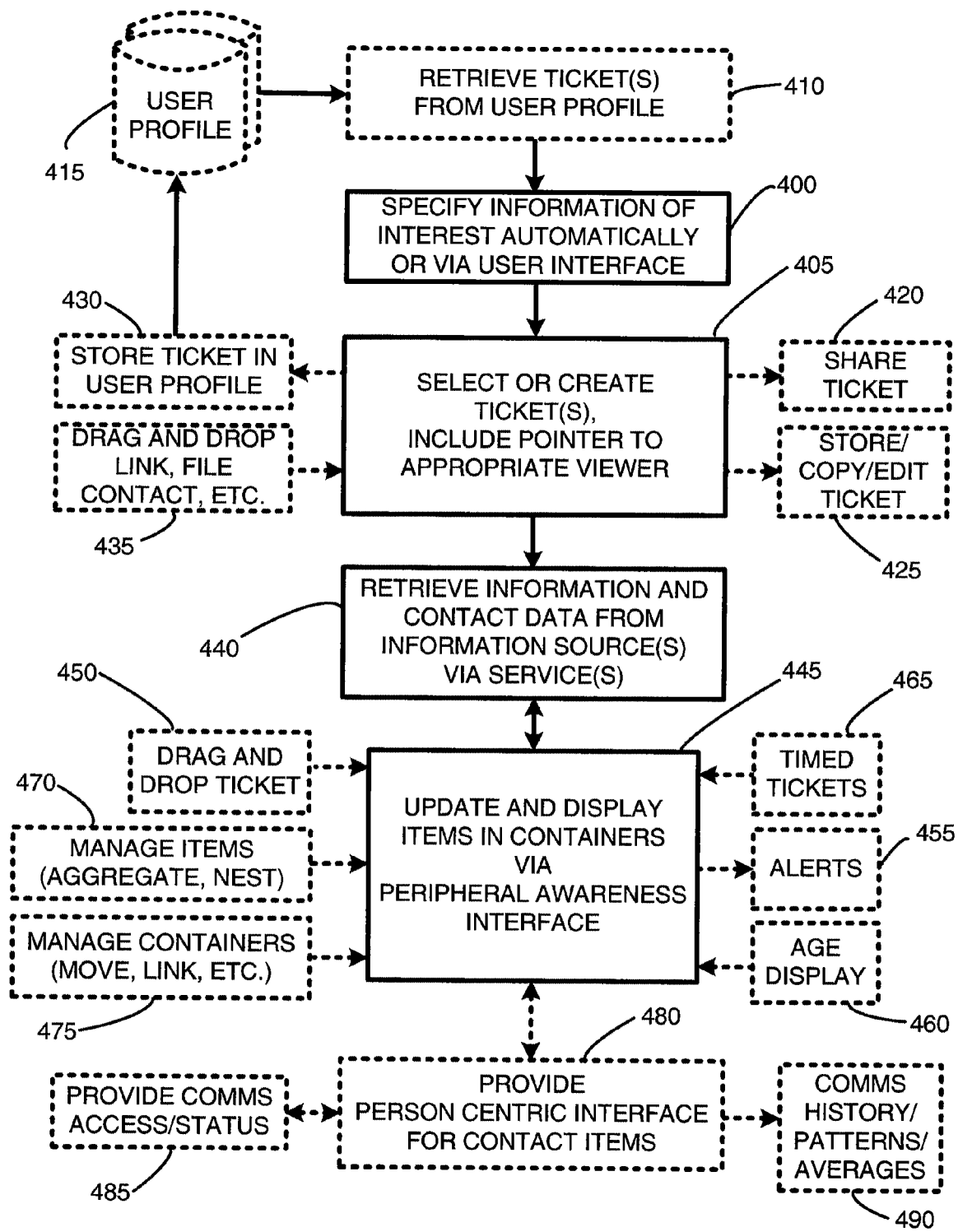
FIG. 4A is a flow diagram illustrating an exemplary process for providing peripheral awareness of contacts and information of interest to a user via a peripheral awareness interface according to the present invention.

The above-described program modules, in view of the above described system components and architecture, are employed to provide peripheral awareness of information of interest to a user via a peripheral awareness interface using the exemplary process that will now be described. This process is depicted in the flow diagram of FIG. 4A as a series of actions that illustrates an exemplary method for implementing the present invention. It should be noted that the boxes and interconnections between boxes that are represented by broken or dashed lines in FIG. 4A represent alternate embodiments of the present invention, and that any or all of these alternate embodiments, as described throughout this document, may be used in combination.

In general, the system and process of the present invention is started by first specifying information of interest 400, either automatically, or via the user interface. Next, a ticket is selected, or created 405 for the information of interest 400, and including a pointer to an appropriate viewer, as described above. Further, in one embodiment, the user is provided with a personal profile or database 415 for storing tickets. One or more of the tickets stored in the personal profile 415 preferably automatically show up in containers on particular devices when such containers are started or initialized. This personal profile 415 is essentially a user specific database of tickets. Further, in a related embodiment, the personal profile 415 containing a user's tickets is automatically maintained in a network or Internet accessible database such that whatever information the user decides to track or watch will not only show up on the user's office computer display device, but also on the user's other computing devices, the user's PDA, the user's cell phone, or any other of the user's network or Internet enabled devices having a display device. Either way, once the tickets have been selected, created, or retrieved, 400 or 410, they may be shared 420, as described above, or alternately, they may be stored, copied, or edited 425 for current or later use. Further, once tickets have been created or edited, they may be stored 430 in the user profile 415 for either current or subsequent use.

One additional method for automatically creating tickets involves either pasting or dragging and dropping 235 links, files, contacts, etc., into or onto a container. In one embodiment, generic logic within the container automatically analyzes what was pasted or dropped 235 into the container and automatically creates an appropriate ticket for tracking and/or watching that information or contact, as well as automatically assigning an appropriate viewer for displaying the information or contact. For example, where the user drags and drops 235 a file, folder, or directory to a container 250, a ticket is automatically created, and an appropriate viewer is automatically selected, so that the user can watch the contents of the file, folder or directory. In addition, because tickets are customizable, the user can modify the automatically created ticket to provide for a custom view of the contents of the file, folder, or directory represented by the automatically created ticket.

However the tickets are created, retrieved, specified, etc, once identified, each tickets instructions and controls are used to either retrieve or receive the information of interest via one or more services 440 from one or more information sources as described above. Next, once the information has been retrieved or received, the items (i.e., ticket/viewer pairs) are dynamically displayed 445 as thumbnails, as described above, either individually, in the sidebar, or as grouped thumbnails as described above. In addition, new tickets may be dragged and dropped 450 either to the user's display, to the sidebar, or to particular groups of aggregated tickets as described above. In any event, once these tickets have been dragged and dropped 450 as indicated, they are immediately displayed 445 in the manner described above. Note that as described above, where tickets are dropped onto the display device, outside of a container, the user is provided with an option as to whether the ticket should be displayed in a container, or merely copied as an electronic file.

Further, although the peripheral display is designed to minimize user distraction as described above, circumstances sometimes exist where the user is notified or alerted 455 of high priority information or of a status change of the information. Such alerts 455 can take the form of audible or visual alerts, or some combination thereof, as described above. For example, where a ticket is designed to monitor the current price of a particular stock, the ticket can further include a capability to automatically alert the user when the stock reaches a certain target price. Such an alert may include a visible alert, an audible alert, an alert via an automatically generated email which provides the current stock price, or any other type of audible, visible, or textual alert.

In still another embodiment, also as described above, the ticket thumbnails are aged 460 to indicate the relative time since information was retrieved. In particular, as time passes, the thumbnails can be faded, color may be changed to grayscale, the brightness and/or contrast of the thumbnails may be reduced, or the shading may be changed in order to indicate the relative age of the data represented by the ticket thumbnail. This aging 460 of information applies equally to "disconnected operations," as described below in Section 7.1 where connections to one or more information sources is either degraded or disconnected such that the data provided by a ticket is not current. Further, in another embodiment, tickets are timed 465, such that they show up at predetermined or user definable times, for predefined or user definable periods of time. For example, where the user has a schedule based ticket, a ticket representing a scheduled meeting can be set to appear at a given time prior to the meeting in order to remind the user of the meeting, or to provide other pertinent information relative to the meeting. In further embodiments, again as described above, items within the container may be aggregated or nested 470. In addition, the containers themselves may be moved, nested, linked, or otherwise aggregated 475.

4.1 Person Centric Interface:

As noted above, the tickets can represent communications contacts, i.e., people or other entities. In the context of the present invention, such tickets are referred to as "person tickets." Such person tickets are explained in further detail below in Section 5.0. Information and data, associated with such communications contacts may include, for example, current communications, communication history, communications availability, or communication channels for specific entities. Such information and data is provided in a "person-centric interface" 480 by providing viewers appropriate for displaying such contact tickets in a manner to provide peripheral awareness as described above. Given this person-centric interface 480, the people or other entities are brought to the forefront of the peripheral display. Further, as described below in Section 5.0, by clicking on a face or other image representing a person ticket, a "person window" is automatically opened. As described below, the person window is similar to an enhanced tooltip in that it is a window that provides extended information and actionable elements relating to the particular contact represented by the person ticket.

Consequently, communications access channels and/or status 485 with particular persons or entities via one or more of the services in combination with one or more of the information sources may be reviewed or initiated easily, while a general communications availability of such people or entities may be understood by a user by simply glancing at the peripheral display. For example, as described above, different images, graphics, avatars, etc., may be used to indicate various social queues for illustrating availability status. In addition, again as discussed above, in one embodiment, this person centric interface provides a communications status 485 via any of a number of communications channels for each of the displayed entities. Further, in another embodiment, a "best available" communications channel for communicating with a particular contact can be automatically selected based on a determination of which channel is most likely to be successfully used for communicating with the contact, or on which will provide the best or "richest" communications with the contact.

In addition, in one embodiment, the services associated with communications contacts either tracks or receives the communications availability of entities or contacts of interest to the user. Consequently, in this embodiment, a historical view, pattern, or average of the times that an entity is available for communications is provided via the person-centric peripheral awareness interface. For example, in one embodiment, where the information that a user desires to be tracked or watched represents a particular entity, over time, patterns of communication availability or average communication availability times are automatically determined 490 in accordance with the ticket instructions. For example, this embodiment can be used to determine the time when a person or contact normally begins work, takes breaks, goes to lunch, or leaves for the day. Such determinations can be made using any of a number of conventional techniques, including, for example, simply monitoring the user's keyboard usage to determine whether the user is present in his office.

Such information can be useful to a user in planning times to initiate communications with an entity, or in keeping track of the availability of an entity. In such an embodiment, conventional techniques are used to compute average availability over time. Similarly, in a related embodiment, in determining patterns of availability, conventional expert systems, including, for example, probabilistic models, such as systems using machine learning techniques, are used to predict the availability of an entity based on historical patterns of availability. In these embodiments, predicted, historical or average availability 490 is provided to the user via the display device 260 either as a visual, graphical or textual display, or some combination thereof.

Figure 4B:
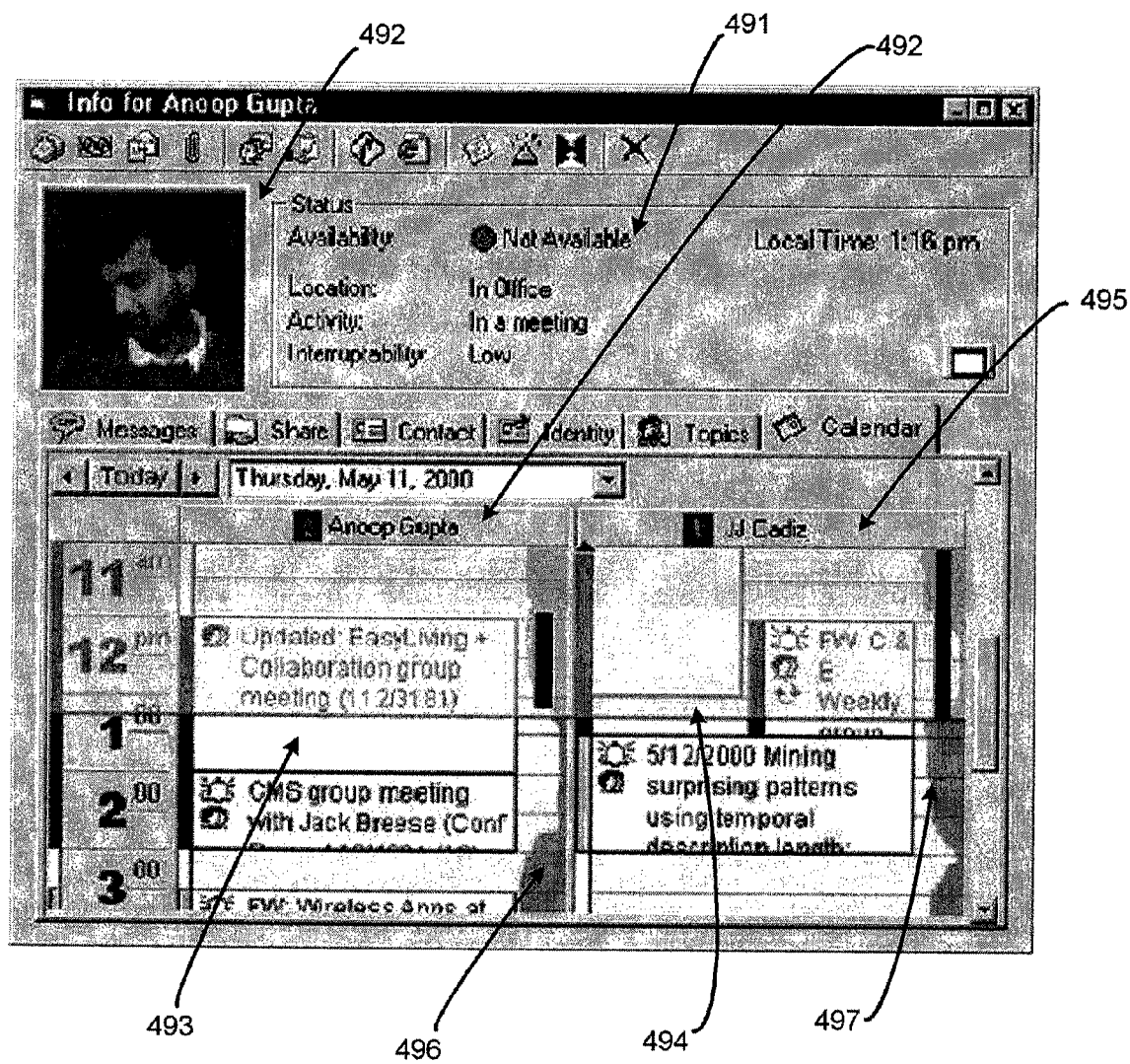
FIG. 4B is an exemplary screen image which illustrates a display of average user availability according to the present invention.

In further related embodiments, the predicted, historical or average availability 490 of multiple entities is provided via the display device 260 as a side-by-side comparison in a visual, graphical or textual display. A working example of the communications availability 490 of multiple users is provided in the screen image of FIG. 4B. This screen image is one example of a "person window." In particular, as illustrated by FIG. 4B, the current availability 491 of a contact of interest 492 is provided in a window which also includes a current schedule 493 of the contact in a side-by-side comparison with the current schedule 494 of the user 495. Further, this screen image also illustrates the average availability 496 of the contact 492 as well as the average availability 497 of the user 495. The average availability, 496 and 497, of the contact 492 and the user 495, respectively, are graphically represented along the right hand edge of the schedule 493 and 494 of the contact and user.

In particular, this average availability 496 and 497 is provided as an area chart that provides average availability trends over time, with a wider area indicating greater average availability, and a narrower area indicating lesser average availability. For example, the graphical representation of the average availability of the contact 492 indicates that the contact is typically not available from about 1:15 pm until about 2:45 pm each day. Similarly, the graphical representation of the average availability of the user 495 indicates that the user is typically not available from about 12:00 noon until about 1:00 pm each day. Further, the graphical representation of the average availability of the user 495 indicates that the user is typically not available for a short period around 3:00 pm each day. It should be noted, that the exemplary screen image discussed above is merely one example of many methods for providing contact availability information. As noted above, such methods include visual, graphical or textual displays of availability.

5.0 Exemplary User Interface

In a computing environment, there are many possibilities for arrangement and placement of the peripheral awareness display described herein. Such possibilities include, for example, a display along one edge, or on any other part of a display or monitor, including the entire monitor, a Windows® sidebar, a portion of a second monitor, a display of a conventional Pocket PC docked near a user's computer, a display of a handheld device such as, for example, a PDA, a cell phone, a handheld or palmtop computer, or similar device, or even via a physical icon, such as, for example, a doll that turns it head to one side when a person or entity which it represents is either available or unavailable for communication.

One advantage of using a sidebar type container for hosting items is that it works for users with a single monitor or display, it remains in the user's periphery, it's always available at a glance (in one embodiment, maximizing an application window doesn't cover it), and it takes up a relatively small amount of screen space. The sidebar may be either single column or multi-column as needed, so as to host all of the items specified by the user. Further, in one embodiment, the width and/or height of the sidebar is user adjustable via the user interface. In another embodiment, multiple sidebars may be instantiated via the user interface, each sidebar being either the same or different sizes. However, as discussed above, the items or iconized tickets need not be displayed within a sidebar having multiple items, and can instead be free floating and individually displayed.

The sidebar is populated with items that provide peripheral awareness to the user. Each of these items provides a visualization of the state of the underlying object(s) or information that it represents. As described above, the sidebar can include a large variety of items and visualizations, i.e. displayed tickets. For example, a sidebar can include items for monitoring an email inbox, an appointment calendar, availability of people that the user wants to communicate with, a database for work assigned to the user, whether there are any changes to a document of interest to the user, whether there are changes in a particular folder or directory, response status of an invitation to a party, status of an online auction, the order status of an item purchased over the Internet, or any other item representing information of interest as described above. As described above, it should be noted that the types of items being watched or monitored in accordance with the instructions of the tickets include generic items such as an email inbox, or the communication status of one or more people, custom items authored to monitor any sort of local or remote data, such as a local or remote database, or specific elements within such databases, and custom items authored by third parties, such as, for example, order status tickets, party invitation tickets, advertisement tickets, and shipment tracking tickets, etc.

As noted above, items with the container may be arranged or rearranged. Arranging items within the sidebar is accomplished in one embodiment by dragging and dropping existing items within the sidebar to whatever location is desired by the user. In a related embodiment, items within the sidebar are automatically arranged in order of priority. This priority is preferably assigned by the user, but in further embodiments, the priority is automatically determined based upon the information type or the age of the information (i.e., how current the information is) for any given item. In still another related embodiment, the positioning of particular items within a container may be assigned a fixed or locked position, either manually or automatically, such that locked items will always maintain a consistent location within the sidebar, regardless of how other items with the container are arranged or rearranged. This embodiment is particularly useful for ensuring that a user does not waste time looking for an item that resides in a place other than where the user expects it to be.

In one embodiment, items or tickets are displayed in a single ticket container, in what can be described, at least in a behavioral sense, as a single-ticket sidebar. Consequently, a ticket can be displayed alone on a computer display device, and can be moved around the display device like any other window or icon using conventional techniques. An additional benefit of this capability is that in one embodiment, a ticket can be embedded in an electronic document, such as, for example, a word processor file or a presentation file. The behavior of an embedded ticket is the same as that described herein for a standalone ticket, or in other words, for the behavior described for tickets displayed within the sidebar.

In one embodiment, single displayed tickets can be moved using a conventional computer pointing device. In a related embodiment, where one or more displayed tickets are moved such that they come into contact with another displayed ticket, the displayed tickets automatically snap together to form a lager sidebar or container which is then treated as a single sidebar or container as described above. Further, in another related embodiment, where multiple displayed tickets are snapped together, they are automatically moved into either an existing container, or into a newly instantiated container not having any other items or tickets. In additional embodiments, tickets that have been snapped together may also be pulled apart, and tickets existing in containers may be removed or copied from the container and moved or pasted to the computer display device, or to an electronic document as described above.

As mentioned previously, one type of information that is provided for by the tickets of the aforementioned peripheral awareness interface is information about people, especially as it facilitates communication and coordination. Consequently, tickets for communicating with people use images or pictures of faces to represent the people embodied by the ticket. Further, the image or picture of a face for a particular person automatically changes as the communications availability or status changes. In general, availability can be represented as a social state, which, in turn, is represented in one embodiment by the social cue of eye contact. Thus, one exemplary method for using tickets to indicate a persons communication availability status is to use a frontal close-up when the person available, and a profile when the person is busy. In other words, a person looking towards the user is available, while a person looking away is not. However, it should be appreciated that any type of images or pictures for representing availability may be used in place of the exemplary images described above.

Further, as with any other ticket, selecting the ticket, such as, for example, by clicking on the face represented on the displayed ticket automatically opens a window, i.e., a "person window" similar to the enhanced tooltips described above. This person window includes further information about the person or entity, as well as action buttons for initiating communication via any of a number of conventional communications channels, i.e. email, voice mail, instant messaging (IM), cell phone, telephone, mail, etc. Clearly, the concept of communicating with a person can be extended to communication with any other entity such as an organization or a business, with any appropriate pictures or images being used to represent communications availability status for the entity. See, for example, FIG. 8B, which is discussed below in Section 6.0.

In one embodiment, in addition to the information about initiating communication with a person or other entity, the window opened by selecting a person ticket also includes a history of communications with that person. Such communications include, for example, email, IM sessions, phone calls, coauthored documents, meetings in the past and the future, etc. In other words, the window opened by selecting a person ticket includes a communication log that is basically a chronological record of messages that the user sent to the particular person, that the person sent back, and that any third person sent to both. See, for example, FIG. 8C, which is discussed below in Section 6.0. Further related embodiments include more detailed information about the person such as, for example, free/busy calendar information, historical information about when a person is typically available, and information about when the person has been available today so far. Consequently, as described above, such information is used in alternate embodiments to provide historical, average, or predicted availability. See, for example, FIG. 4B, which is discussed above in Section 4.1.

Information about a person's availability or state can be obtained from any conventional system such as, for example, MSN® Messenger®, however in more extensive embodiments, the tickets representing a person include instructions for gathering additional data about the state of a person using simple sensors such as desktop cameras and microphones integrated with the person's computer. It should be appreciated that there are many other conventional methods for determining the availability of a person, such as for example, using conventional techniques to determine whether a person's cell phone is in use, or moving between stationary cell sites, thereby indicating that the person is either already talking to someone, or traveling. Another example for determining the availability of a person involves using conventional techniques for determining whether the person is using a computer keyboard or pointing device.

While items provide peripheral awareness of the state of an object or of particular information of interest, they also provide access to more focused interaction with that object or information. Specifically, items provide two types of action: drilling down to get more information, i.e., selecting an item and opening the item as described above (i.e. enhanced tooltips, person window, nested items, etc.), and interacting with the source object or information being monitored by the ticket. For example, in one embodiment, hovering the mouse or computer pointing device over an item provides a large, actionable HTML tooltip with extended information, while double-clicking an item takes the user to the source item.

As described above, such tooltips are actionable in the sense that if a user clicks on or otherwise selects particular information or elements within the tooltip, in one embodiment, the tooltip will automatically link to more detailed information for the particular information or elements. Further, in one embodiment, tooltips may be nested, such that is a user hovers a mouse or other computer pointing device over the particular information or elements within a first tooltip, a second tooltip will pop up with extended information relating to the particular information or elements within the first tooltip. Clearly, any number of levels of nesting may be applied when implementing nesting tooltips. Similarly, double-clicking a person item or ticket brings up the aforementioned "person window", double-clicking an item watching for changes in a folder brings up the folder, and double-clicking an email inbox item brings up the user's email inbox. Additionally, in another embodiment, right-clicking an item provides an extensive menu of these and additional commands such as, for example, editing, deleting, or adding additional items. Similarly, in another embodiment, a "ticket manager" for allowing the user to use any of the aforementioned actions or commands, is provided for managing items or tickets either displayed in the sidebar, or contained in a ticket database, respectively.

One method for creating new items is to drag and drop objects onto a container or sidebar. For example, if a user wants to watch a particular folder or directory, that folder is simply dragged to the sidebar; if the user wants to watch a person, the user simply drags and drops an address book entry from a conventional electronic address book to the sidebar; or if the user sees an item on a web page that the user wants to watch, the user drags and drops it to the sidebar. Alternatively, in one embodiment, the user can right-click any file, any person's name, any proper noun, any database, etc., accessible via the user's computing device to open a context menu that includes a "Watch This Item" option, or the like. Further, in one embodiment, a wizard or other conventional automatic assistance program or application is provided in order to assist the user in automatically creating, modifying, or deleting items on the sidebar or in the container.

Finally, as discussed previously, in one embodiment, items can be placed into groups on the sidebar. In another embodiment, these groups can be aggregated by collapsing them. In other words, information from each of the items in a single group is combined and displayed in a single thumbnail. When the group is opened by selecting the thumbnail representing that group, any items forming the group can be viewed or selected individually, as described above. Further, such aggregated groups are useful for increasing usable space on the sidebar and for reducing visual complexity when a user is not interested in low-level details of particular items within such groups.

Figure 5:
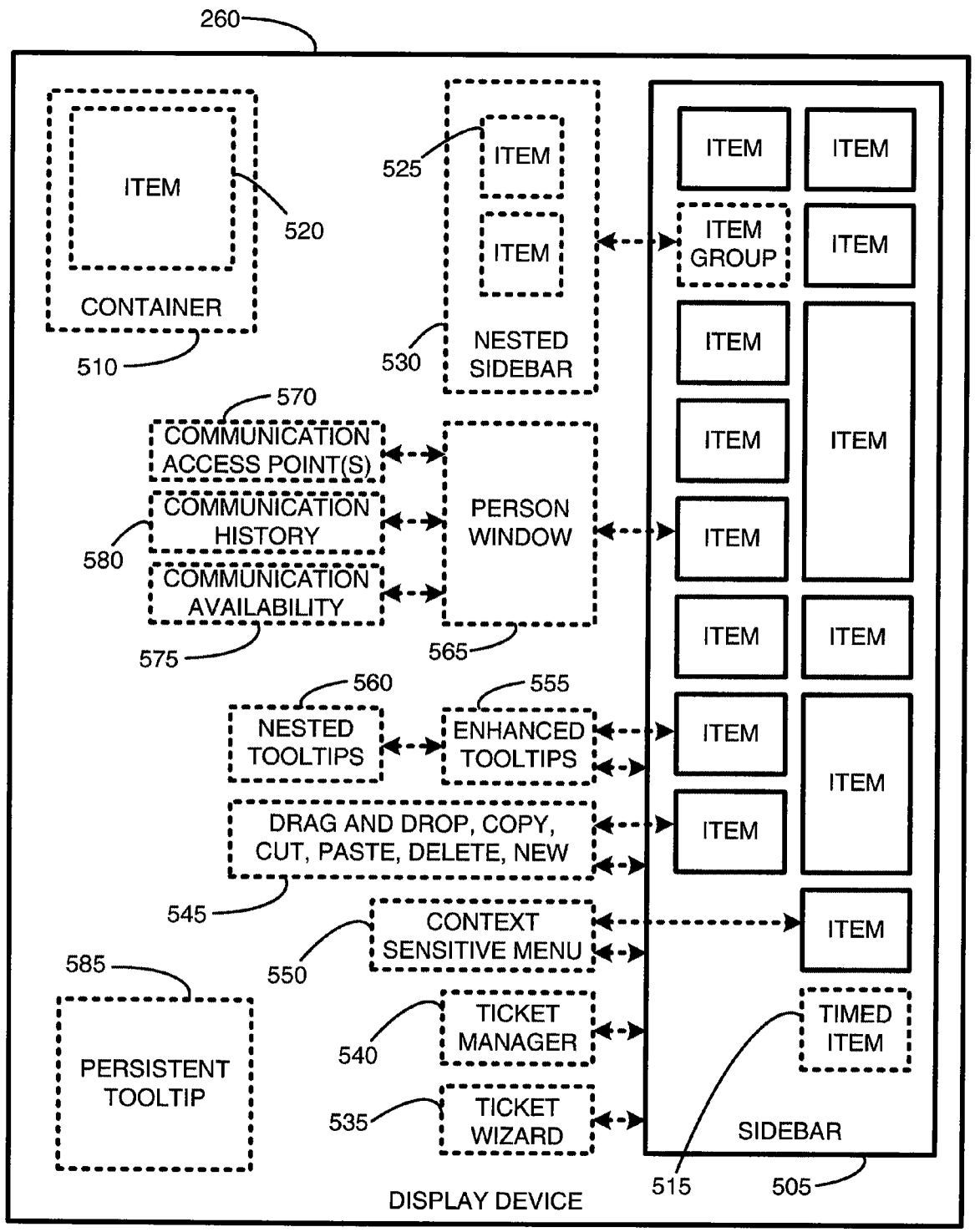
FIG. 5 is an exemplary block diagram that depicts an exemplary user interface for interacting with a system and process in accordance with the present invention.

The user interface described above can be represented by the exemplary block diagram of FIG. 5. It should be noted that the boxes and interconnections between boxes that are represented by broken or dashed lines in FIG. 5 represent alternate embodiments of the present invention, and that any or all of these alternate embodiments, as described throughout this document, may be used in combination.

In particular, in accordance with the preceding discussion, FIG. 5 illustrates an exemplary user interface for interacting with a system and method according to the present invention is implemented on a display device 260 using conventional techniques. The user interface includes at least one sidebar 505 or container 510 for displaying iconized tickets, including timed tickets, or items 515, 520 and/or 525 as described above. As noted above, multiple sidebars or containers, 505 or 510, may be instantiated on the display device 260. Each sidebar or container, 505 or 510, can either have the same or different items, 515 and 520, as described above. Further, also as described above, sidebars or containers may be nested or aggregated, i.e., sidebars 505 and 530. Further, any desired number of levels of nesting is provided by a system and method in accordance with the present invention. Also, the sidebars 505 or containers 510 may be individually resized either automatically, or via the user interface. As described above, resizing the sidebar 505 or container 510 serves to automatically resize any items 515, 520 or 525, displayed therein. Additionally, the sidebars 505 or containers 510 may be moved within the display device 260 as described above.

Interaction with the sidebar 505, container 510, and items 515, 520 or 525, is provided via one of several exemplary user interface functions. Specifically, in one embodiment as described above, the ticket wizard 535 or similar application for automatically assisting the user in creating, selecting, modifying, or deleting tickets is provided. Similarly, in another embodiment, the ticket manager 540 is provided to allow a user to manually select, create, modify, or delete tickets. In addition, in further embodiments, the user interface of the present invention provides capabilities for allowing the user to directly interact with the sidebar 505, container 510, or items 515, 520 or 525, by simply dragging and dropping, copying, cutting, pasting, deleting, or creating new sidebars, containers, or items 545. One simple example of using such capabilities is that a new item is automatically created within the sidebar 505 by simply dragging and dropping a link to an item of interest to the sidebar. As described above, this can include dragging and dropping a folder, file, or address book entry from any desired source application to the sidebar 505.

Each item, 515, 520 or 525, as well as each sidebar 505 or container 510, has an associated context sensitive menu 550, as described above, which is implemented using conventional techniques for allowing a user to directly interact with the sidebars, containers, and items. Several methods exist for accessing each context sensitive menu 550, such as, for example, by right-clicking an item, 515, 520 or 525, the sidebar 505 or the container 510, or by hovering a computer pointing device above one of the items, the sidebar, or the container. In a further related embodiment, enhanced tooltips 555 are provided for each item 515, 520, or 525, as well as for each sidebar 505 or 530, or container 510. Also as described above, these enhanced tooltips 555 may be nested 560 to any desired level of nesting.

Further, where items 515, 520 or 525 represent a person or other entity, as described above, the iconized ticket is preferably represented by a graphical image representing the current availability of the entity. Further, a person window 565, also as described above, is provided for each item 515, 520 or 525 representing an entity. The person window is useful for providing further information about the person or entity, as well as action buttons for initiating communication via any of a number of conventional communications channels or access points 570, i.e. email, voice mail, instant messaging (IM), cell phone, telephone, mail, etc. In addition, in another embodiment, the person window 565 includes a communications availability function 575 that is useful for providing historical, average, or predicted availability for particular entities.

Finally, in one embodiment, the enhanced tooltip windows 555, or nested tooltip windows 560 are persistent until closed. For example, such tooltips, 555 or 560, can be grabbed using a conventional pointing device and moved to any desired location of the display device 260. Such "persistent" tooltips then stay visible until manually closed by the user.

6.0 Working Example

As illustrated by the exemplary screen images of FIG. 4B, and FIGS. 6-13, a working example according to the present invention is embodied in a system and process that automatically provides peripheral awareness of information of interest to a user via the peripheral awareness interface as described herein.

Figures 6A, 6B:
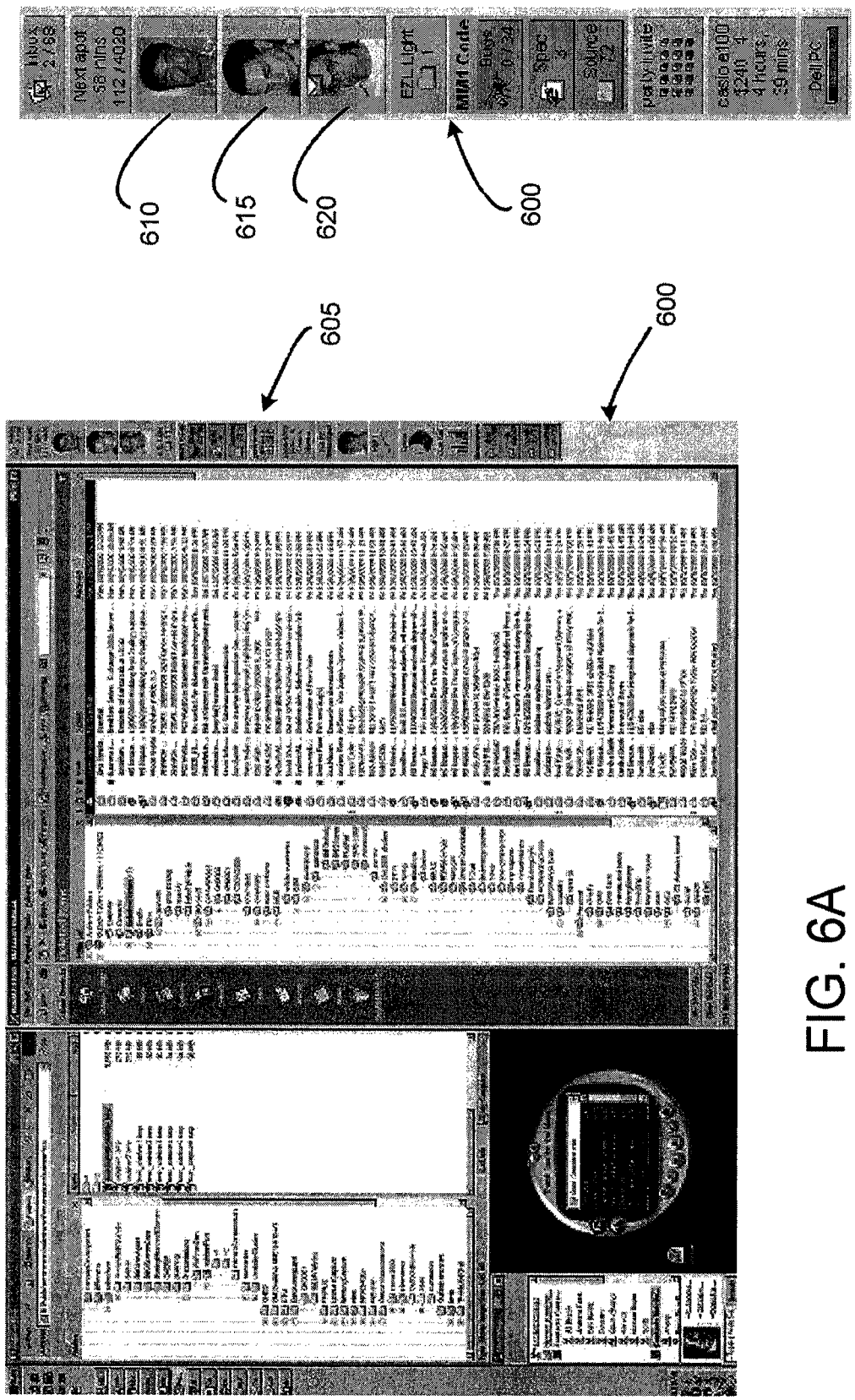
FIG. 6A is an exemplary screen image illustrating a working example for automatically providing peripheral awareness of contacts and information of interest to a user via a peripheral awareness interface in accordance with the present invention.
FIG. 6B is an exemplary screen image showing the peripheral awareness interface of FIG. 6A.

In particular, as illustrated by the exemplary screen image of FIG. 6A, a container/sidebar 600 having items 605 (i.e., ticket thumbnails) is provided on the right edge of the display. As discussed above, this sidebar 600 may be provided on any edge of the display device, the entire display device, or may simply float, i.e. be placed anywhere on the display device. Further, the sidebar can be dragged around the display device and resized by the user using conventional techniques. FIG. 6B is a larger view of a top portion of the sidebar 600 of FIG. 6A. Note that this sidebar 600 includes three faces 610, 615, and 620, i.e. the person centric interface described above. In order to facilitate peripheral awareness of the communications availability or status, the ticket thumbnails for communicating with people use images or pictures of faces to represent the people embodied by the ticket. Further, the image or picture of a face for a particular person automatically changes as the communications availability or status changes.

Availability in this working example is represented as a social state, which, as discussed above, can be represented by the social cue of eye contact. Thus, one exemplary method for using tickets to indicate a persons communication availability status is to use a frontal close-up when the person available, and a profile when the person is busy. In other words, a person looking towards the user is available, while a person looking away is not. However, it should be appreciated that any type of image or picture for representing availability may be used in place of the two exemplary images described above. Thus, as illustrated by the sidebar 600 of FIG. 6B, the entity represented by thumbnail 610 is available, while the entities represented by thumbnails 615 and 620 are busy, as they are looking away in the image.

Figure 6C:
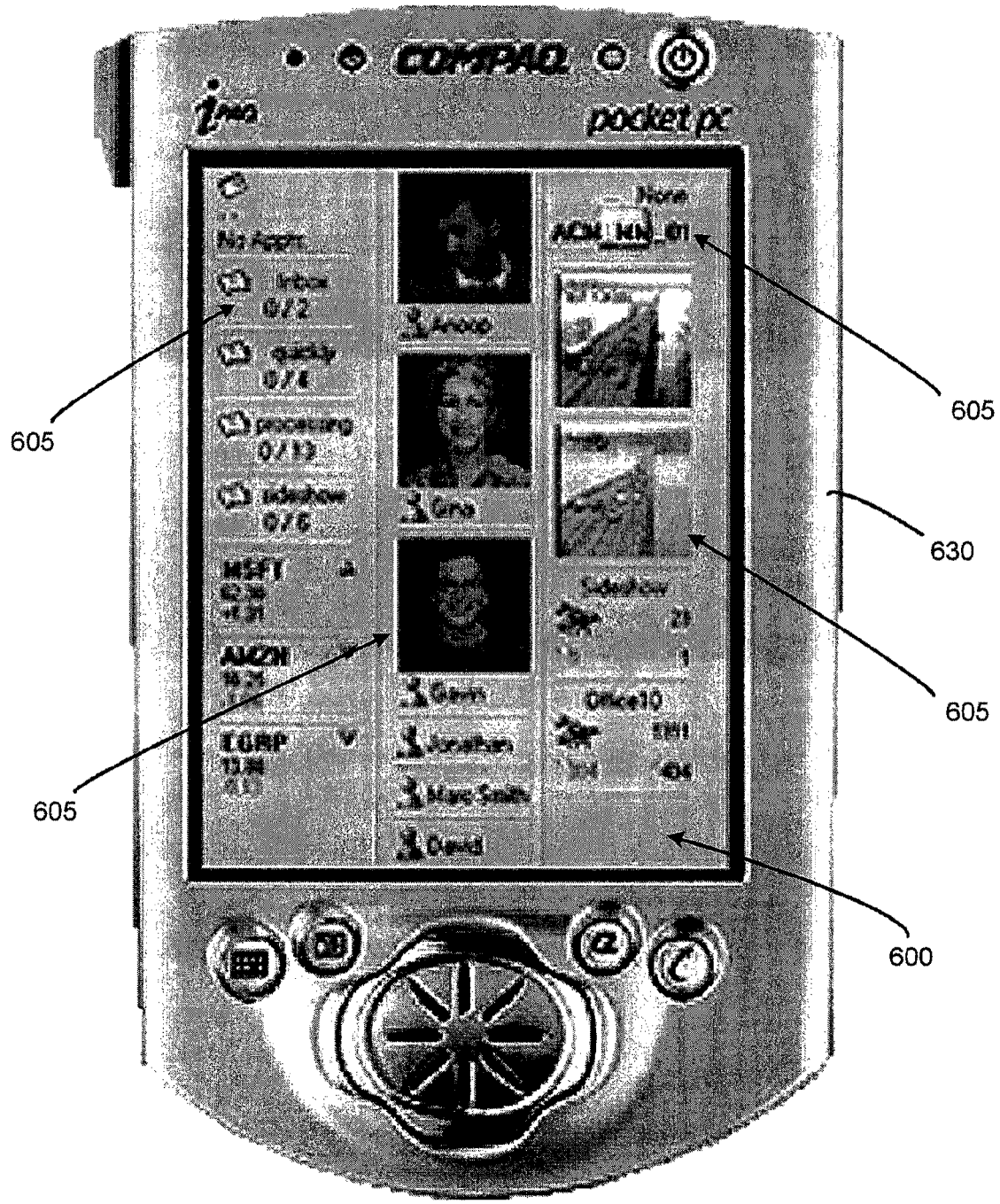
FIG. 6C is an exemplary screen image illustrating a working example for automatically providing peripheral awareness of contacts and information of interest to a user via a peripheral awareness interface covering the entire display on a conventional Pocket PC in accordance with the present invention.

Further, as illustrated by the image of FIG. 6C, a container/sidebar 600 having items 605 (i.e., ticket thumbnails) may cover the entire display. As noted above, this embodiment is particularly useful when using devices having relatively small displays, such as, for example a hand held device like the Pocket PC 630 illustrated by FIG. 6C. User interaction with tickets on such handheld devices is similar to that described above for tickets displayed on other conventional devices. Also as noted above, such hand held devices may be placed or docked near a desktop or other computer and used for the purpose of displaying and interacting with tickets so as to minimize any potential use of a primary display screen on the desktop or other computer.

Figure 7B:
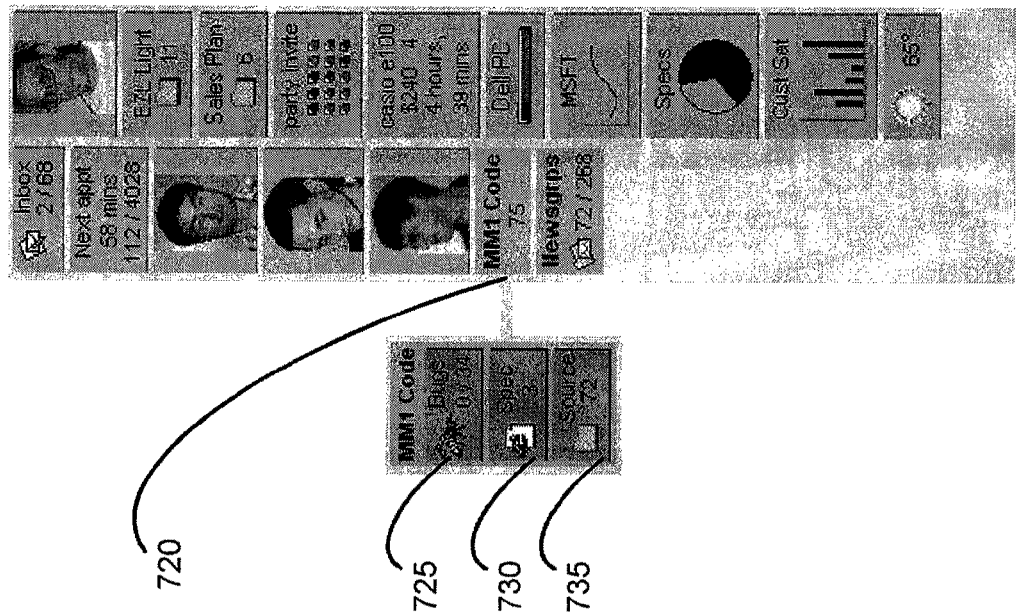
FIG. 7B is an exemplary screen image illustrating expansion of a group of nested "items" in the peripheral awareness interface of FIG. 7A.
Figure 7A:
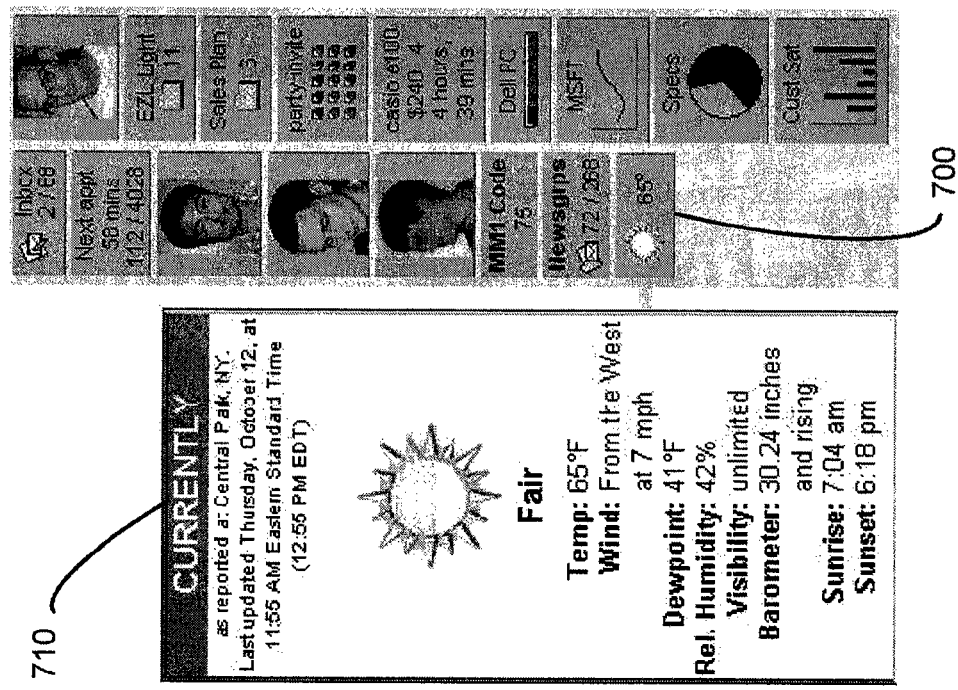
FIG. 7A is an exemplary screen image illustrating expansion of an "item" displayed in a peripheral awareness interface in accordance with the present invention.

FIG. 7A illustrates the concept of "enhanced tooltips" as described above. In particular, when the user either selects or hovers the computer pointing device over the thumbnail for weather, detailed information regarding the weather 710 automatically pops up. FIG. 7B illustrates the concept of nested tickets. In particular, as illustrated by FIG. 7B, the MM1 Code ticket thumbnail 720 summarizes bugs and errors for three nested sub-items, 725, 730, and 735. Consequently, when the user either selects or hovers the computer pointing device over the thumbnail for the MM1 Code ticket thumbnail 720, the nested sidebar containing the three sub-items, 725, 730, and 735 pops up. The user is then free to access any of these nested items, 725, 730, and 735. Further, any or all of these nested items, 725, 730, and 735, may have further levels of nested sub-sub items which are user accessible in the same manner as the parent sidebar ticket thumbnail 720.

FIG. 8A is an exemplary screen image illustrating an alternate embodiment of a peripheral awareness interface 800 showing pawns 805 associated with person items 810, 815 and 820 in accordance with the present invention. Note that in this embodiment, the pawns 805 are provided in addition to the images of the person for each person item 810, 815 and 820. The use of pawns serves as an additional indicator of communications status or availability where a non-standard or ambiguous image is used for representing a particular contact. FIG. 8B is an exemplary screen image illustrating a dynamic person window or "enhanced tooltip" person window 825 accessed by selection of one of the person items 815 of FIG. 8A. Note that the "enhanced tooltip" window opened by selection of the person item 820 provides a short summary of new messages 825 and 830 sent from the person represented by the person item 820. Note also the availability via any of five individual communications channels 840, including a short message, email, voice mail, telephone call, or in person availability. Also note that a time 845 since the person represented by the person item 820 was last available is provided for each communication channel 840.

Further, FIG. 8C, is an exemplary screen image illustrating historical communications information associated with the person represented by the person window of FIG. 8B. This historical communications window 855 is automatically opened in one embodiment by selecting the image of the person in the enhanced tooltip person window 825. This historical communications window 855 includes a summary to all past communications with the person represented by the person item 825 of FIG. 8A.

Figures 9, 10:
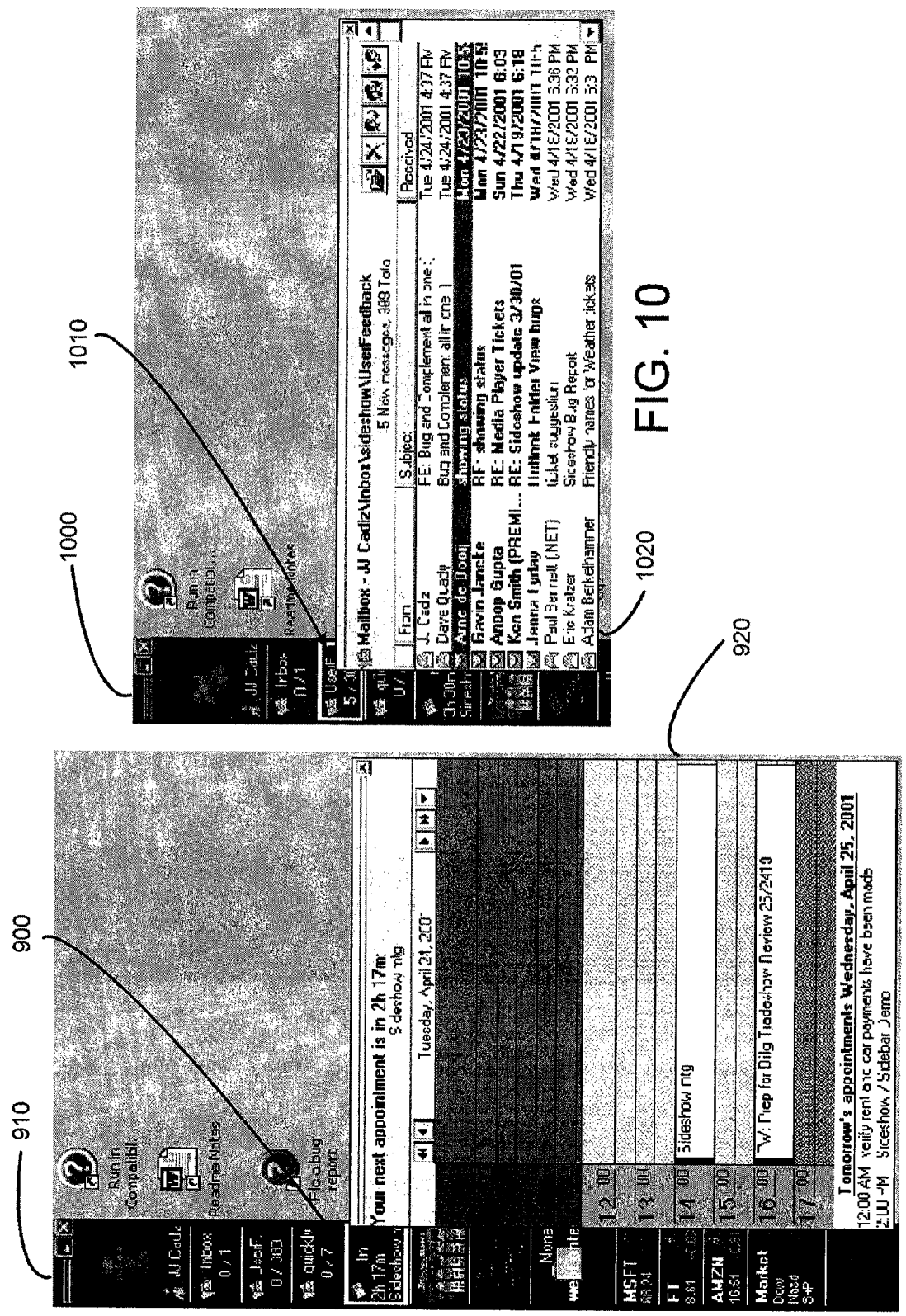
FIG. 9 is an exemplary screen image illustrating expansion of a calendar item in accordance with the present invention.
FIG. 10 is an exemplary screen image illustrating expansion of an email item in accordance with the present invention.

FIG. 9 and FIG. 10 represent further examples of different types of tickets. For example, FIG. 9 illustrates a calendar/scheduling type ticket item 900 within a sidebar/container 910. User selection of the calendar ticket/item 900 serves to expand/open an enhanced tooltip window that includes further details of the calendar/schedule represented by the calendar/schedule item. Similarly, FIG. 10 represents an email type ticket/item 1010 within another container/sidebar 1000. User selection of the email ticket/item 1000 serves to expand/open an enhanced tooltip email window 1020 which allows user interaction with received email as from within a typical email application.

Figure 11A:
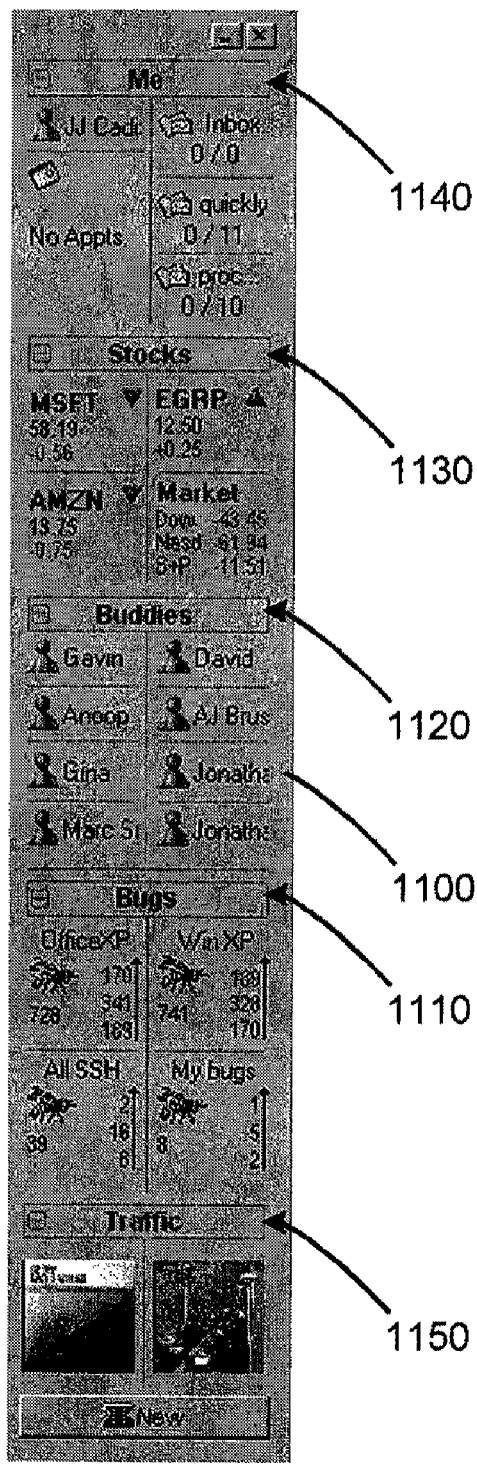
FIG. 11A is an exemplary screen image illustrating an alternate embodiment of a peripheral awareness interface having collapsible groups of items in accordance with the present invention.
Figure 11B:
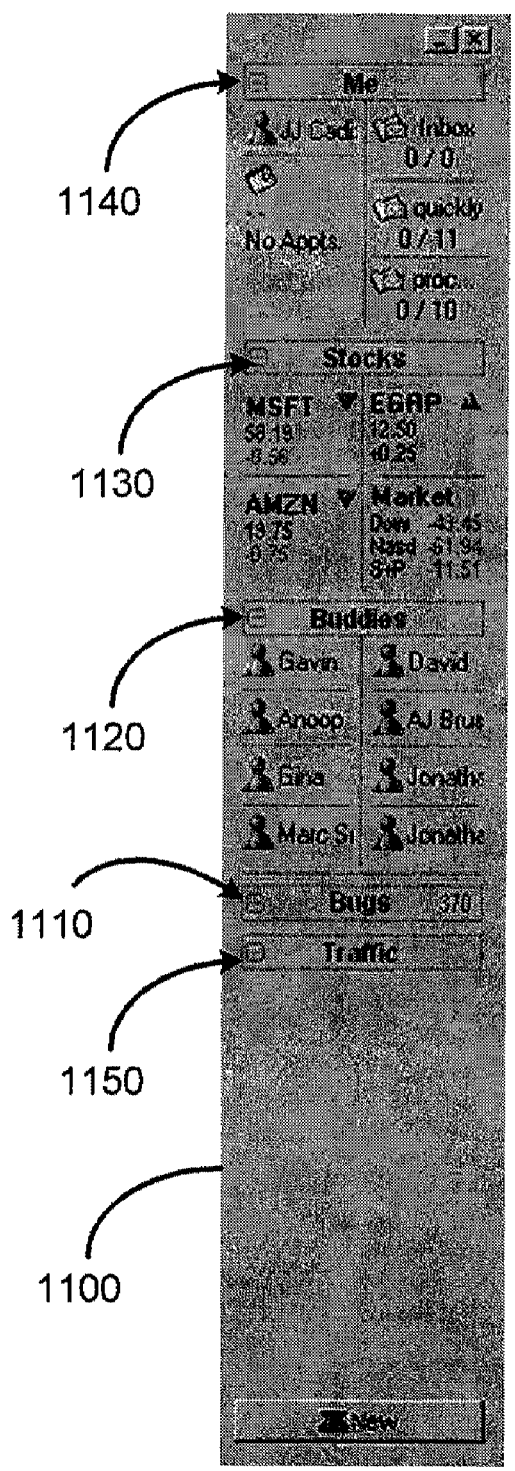
FIG. 11B is an exemplary screen image illustrating the peripheral awareness interface of FIG. 9A showing two of the groups of items in a collapsed state.

FIG. 11A and FIG. 11B represent alternate embodiments a peripheral awareness interface 1100 having collapsible groups of aggregated items 1110, 1120, 1130, 1140, and 1150 in accordance with the present invention. In particular, user selection of such a collapsible group, 1110, 1120, 1130, 1140, and 1150, when expanded serves to collapse the group, as illustrated by the difference between FIG. 11A and FIG. 11B. In particular, in FIG. 11A, a "Bugs" group 1110 and a "Traffic" group 1150 each include several sub-items. User selection of both the "Bugs" group 1110 and the "Traffic" group 1150 serve to collapse those groups, thereby freeing space within the container/sidebar 1100 as illustrated in FIG. 11B. Further, because such groups can include multiple types of tickets, a multi-viewer, i.e., an aggregation of individual viewers, is used to display a summary of the information for each of the aggregated tickets in a single thumbnail view. In particular, it can be seen in FIG. 11B that the graphical representation of the "Bugs" group 1110 includes the number 370 along the right side of the graphical representation. This number represents a summary of the bug numbers represented by the sub-items, or aggregated tickets, illustrated in FIG. 11A.

Figure 12:
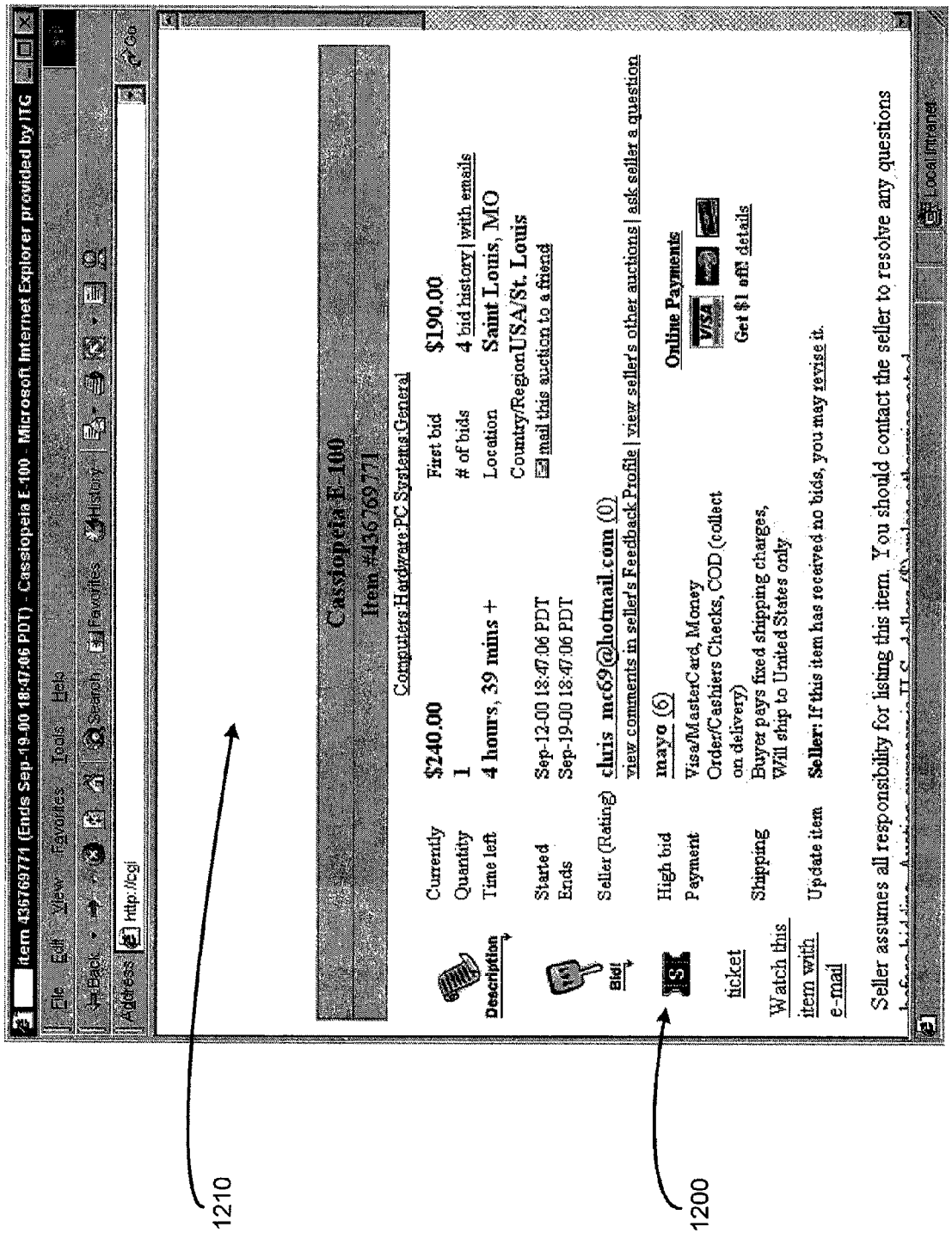
FIG. 12 is an exemplary screen image illustrating a graphically displayed downloadable ticket embedded in a web page in accordance with the present invention.

FIG. 12 is a screen image that illustrates an exemplary use of a ticket 1200 embedded in a web page 1210. In this example, the ticket 1200 is represented by a graphical icon. As described above, the user can simply drag and drop the icon to either the user's sidebar, or the user's display. Note that as described above, where tickets are dropped onto the display device, outside of a container, the user is provided with an option as to whether the ticket should be displayed in a container, or merely copied as an electronic file. Further, the user can copy and paste the ticket icon 1200 to a computer readable storage medium for later use or transfer to another user or another computer. This exemplary ticket icon 800 will then keep track of the auction item represented by the web page 810, in the manner described above.

Figure 13:
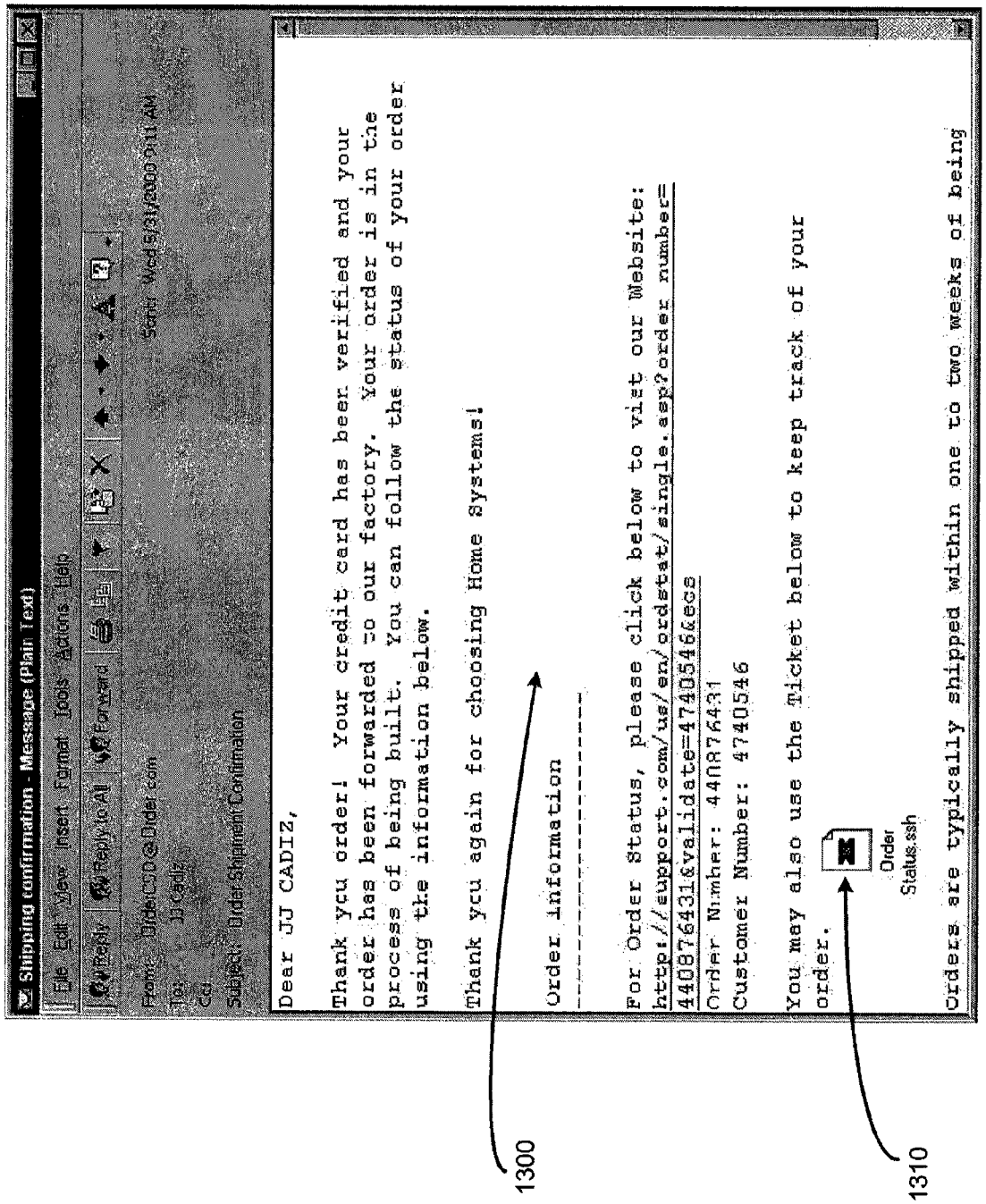
FIG. 13 is an exemplary screen image illustrating an email message with an attached ticket in accordance with the present invention.

FIG. 13 is an exemplary screen image showing an email message 1300 with an attached ticket 1310. As illustrated by the screen image FIG. 13, this example of the utility of third party tickets includes a custom designed ticket for tracking order status via the Internet. For example, in one embodiment, where a user orders an item over the Internet, the ticket 1310 is automatically created by the vendor web site that includes instructions for interfacing with a vendor order status database to provide order status information, along with instructions as to how this information should be displayed in the thumbnail. As described above, this ticket 1310 is then provided to the user via any of the aforementioned methods, such as for example, via email, or simply via dragging and dropping the graphical representation of the ticket from the vendor web site to the user's display device or to a container or sidebar displayed on the user's display device. Thus, referring to the screen image of FIG. 13, the user can simply place this status ticket 1310 on his computer display, or in the container/sidebar. Thereafter, when the user wants to check the status of the order, all the user has to do is glance at the ticket thumbnail provided by the vendor, or select the ticket via the computer pointing device as described above, to open a detailed information window, i.e. the aforementioned enhanced tooltip window, relating to the status of the order.

Similarly, such third party tickets can be used to create dynamic advertisements that can be provided to users as described above, via any of the transmission methods provided above. These advertisements can then be placed on the user's desktop or in the sidebar/container, either automatically or by the user. Further, in a related embodiment, third party tickets such as advertisements also include instructions for reporting their use to a central server for collecting statistical information of the use of such third party tickets. One advantage of compiling such statistical information is that a ticket use fee can be charged to third party vendors of tickets based on the number of users, length of time used, or purchasing habits of user's viewing or otherwise using the third party tickets.

7.0 Additional Embodiments

In addition to the embodiments described above, several further embodiments have been implemented to further increase the functionality and usability of a peripheral awareness interface in accordance with the present invention. In particular, such embodiments include information caching services, disconnected operations, and selective item visibility.

7.1 Information Caching Services and Disconnected Operations:

In one embodiment, the system and process of the present invention automatically acts to increase the utility of the peripheral awareness interface by caching information and contact data via a caching service. Thus, in a "disconnected operations" embodiment, where Internet or network connectivity has been degraded or terminated, cached data for each item will continue to be displayed via items hosted in one or more containers. However, such cached data is preferably aged, as described above in Section 4.0, to show the passage of time from the point that the data was initially gathered or observed so that the user is aware of how current the data is.

In a related embodiment, contact items will show only those items wherein communication is still possible following degradation or termination of Internet or network access. Thus, for example, in this embodiment, where all Internet or network type communications services, such as, for example, email, peer-to-peer messaging, etc., are no longer possible, the contact item will still continue list available communications channels, such as a telephone number, while hiding or removing non-available communications channels such as an email channel.

7.2 Item Visibility:

In a further embodiment, a visibility bit or switch is associated with each item, such that it can be either visibly displayed or hidden from view. When hidden from view, the item still continues to track or watch information or contacts as described above. Consequently, this embodiment is particularly useful where a user does not desire to display particular items within the container, but does want the information or contact represented by the item to be tracked or watched. Thus, the user can toggle the visibility bit at any time to see the current status of the information or contact. In a related embodiment, the visibility bit or switch associated with the item is timed such that the information or contact is tracked or watched in the background, and the item automatically becomes visible at a predetermined time. In a further related embodiment, both the time when an item becomes visible and a duration for which it remains visible are both user adjustable via the user interface.

In still another related embodiment, a software "agent" is used to determine an appropriate time to display hidden items based on particular user actions. For example, where the agent observes the user purchasing an object via the Internet, the agent can automatically display a shipment tracking item as soon as the user receives email confirmation of shipment from the vendor from which the object was purchased. Another example of this capability is provided by the following discussion. As noted previously, where a user purchases an airline ticket via the Internet or via some other type of local or remote network, or schedules a flight in his or her calendar or scheduling program, a timed ticket may be automatically created, then displayed within a predetermined time of the flight departure time. Such tickets can include many types of information of interest to the user, such as, for example, the current flight schedule, i.e., whether it is on time or delayed, the weather at the flight destination, etc. As the time for the scheduled flight passes, the items representing the timed tickets are automatically removed from the display.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer executable method of displaying dynamic information in a peripheral awareness display area, said method comprising:
   displaying to a first user a thumbnail in the peripheral awareness display area on a display of a computing device, said thumbnail comprising a ticket representative of dynamic information and a viewer for displaying the dynamic information represented by the ticket, wherein the ticket is transferable between the first user and at least one additional user;
   receiving the dynamic information represented by the ticket at the computing device;
   displaying to the first user the received dynamic information represented by the ticket in the viewer of the thumbnail in the peripheral awareness display area on the display;
   displaying to the first user in the peripheral awareness display area on the display of the computing device summary information associated with a user-selected portion of the dynamic information represented by the ticket; and
   displaying to the first user in the peripheral awareness display area on the display of the computing device more detailed information associated with a user-selected portion of the summary information.

2. The method of claim 1 wherein the peripheral awareness display area is a sidebar window displayed along a peripheral portion of the display.

3. The method of claim 1 wherein the display contains at least one other displayed element, the peripheral awareness display area always being displayed on top of the at least one other displayed element.

4. The method of claim 1, further comprising configuring the peripheral awareness display area in one of a first state and a second state based on a command input, wherein the peripheral awareness display area is non-visible on the display in the first state and visible on the display in the second state.

5. The method of claim 1 wherein the thumbnail is resizable, and the steps further comprise displaying a different amount of the dynamic information in the thumbnail based on the size of the thumbnail.

6. The method of claim 5 wherein content of the dynamic information displayed in the thumbnail is based on a priority of the dynamic information.

7. The method of claim 5 wherein the peripheral awareness area is resizable, resizing of the thumbnail based on resizing of the peripheral awareness area.

8. The method of claim 1, further comprising:
monitoring the dynamic information represented by the ticket of the thumbnail to identify when the dynamic information matches a predetermined criteria; and
outputting an alert notification when the dynamic information represented by the ticket of the thumbnail matches the predetermined criteria.

9. A system for displaying dynamic information to a user in a peripheral awareness display area, said system comprising:
a display device; and
a computing device coupled to a data communication network, said computing device displaying dynamic information to the user in the peripheral awareness display via the display device, said computing device being configured to execute computer-executable instructions for:
displaying to a first user a thumbnail in the peripheral awareness display area, said thumbnail comprising a ticket representative of dynamic information and a viewer for displaying the dynamic information represented by the ticket, wherein the ticket is transferable between the first user and at least one additional user;
receiving the dynamic information represented by the ticket at the computing device via the data communication network;
displaying to the first user the received dynamic information represented by the ticket in the viewer of the thumbnail in the peripheral awareness display area;
displaying to the first user in the peripheral awareness display area summary information associated with a user-selected portion of the dynamic information represented by the ticket; and
displaying to the first user in the peripheral awareness display area more detailed information associated with a user-selected portion of the summary information.

10. The system of claim 9 wherein the peripheral awareness display area provided by the computing device is a sidebar window displayed along a peripheral portion of the display.

11. The system of claim 9 wherein the display provided by the computing device contains at least one other displayed element, the peripheral awareness display area always being displayed on top of the at least one other displayed element.

12. The system of claim 9, wherein the computing devices configures the peripheral awareness display area in one of a first state and a second state based on a command input, wherein the peripheral awareness display area provided by the computing device is non-visible on the display in the first state and is visible on the display in the second state.

13. The system of claim 9, wherein the thumbnail provided by the computing device is resizable, and the steps further comprise displaying a different amount of the dynamic information in the thumbnail based on the size of the thumbnail.

14. The system of claim 13, wherein content provided by the computing device of the dynamic information displayed in the thumbnail is based on a priority of the dynamic information.

15. The system of claim 13, wherein the peripheral awareness area is resizable, resizing of the thumbnail based on resizing of the peripheral awareness area.

16. The system of claim 1, wherein said computing device is configured to execute computer-executable instructions for:
monitoring the dynamic information represented by the ticket of the thumbnail to identify when the dynamic information matches a predetermined criteria; and
outputting an alert notification when the dynamic information represented by the ticket of the thumbnail matches the predetermined criteria.

17. One or more computer-readable storage media having stored thereon computer-executable components for displaying dynamic information to a user in one or more thumbnails in a peripheral awareness display area, said dynamic information received via a data communication network from one or more communications sources, said components comprising:
a user interface component displaying to a first user the one or more thumbnails in the peripheral awareness display area, each said thumbnail comprising a ticket representative of dynamic information and a viewer displaying the dynamic information represented by the ticket, wherein the ticket is transferable between the first user and at least one additional user, wherein the first user specifies particular information of the dynamic information;
a ticket manager component creating particular tickets for the particular information of the dynamic information specified by the first user, modifying particular tickets, or sharing particular tickets between the first user and at least one additional user, said ticket manager component providing a library of defined tickets for creation, modification, or sharing, wherein the ticket manager component pairs each particular ticket with a corresponding viewer for display as a thumbnail; and
an information and communication component dynamically accessing and interacting with one or more communications sources to dynamically provide dynamic information to the one or more thumbnails displayed in the peripheral awareness display area.

18. The one or more computer-readable storage media of claim 17, wherein said user interface component displays, in response to a selection by the first user of one of the one or more thumbnails displayed in the peripheral awareness display area, actionable expanded information that provides additional information for the dynamic information displayed in the selected thumbnail.

19. The one or more computer-readable storage media of claim 18, wherein the ticket manager component stores the particular tickets in a database, said database being accessible via the data communication network.

* * * * *

UNITED STATES PATENT AND TRADEMARK OFFICE
CERTIFICATE OF CORRECTION

PATENT NO. : 8,407,620 B2
APPLICATION NO. : 12/762037
DATED : March 26, 2013
INVENTOR(S) : Jonathan J. Cadiz et al.

It is certified that error appears in the above-identified patent and that said Letters Patent is hereby corrected as shown below:

On the title page, Item 76:

Inventors: Jonathan J. Cadiz, Redmond, WA (US);
          Anoop Gupta, Woodinville, WA (US);
          Gavin Jackie, Sammamish, WA (US)
          Gina Venolia, Kirkland, WA (US)

Should read:

Inventors: Jonathan J. Cadiz, Redmond, WA (US);
          Anoop Gupta, Woodinville, WA (US);
          Gavin Jancke, Sammamish, WA (US)
          Gina Venolia, Kirkland, WA (US)

Signed and Sealed this
Twentieth Day of May, 2014

Michelle K. Lee
*Deputy Director of the United States Patent and Trademark Office*